US006915389B2

(12) United States Patent  (10) Patent No.: US 6,915,389 B2
Fujimoto                    (45) Date of Patent:    Jul. 5, 2005

(54) STORAGE SYSTEM, DISK CONTROL CLUSTER, AND ITS INCREASE METHOD

(75) Inventor: Kazuhisa Fujimoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 277 days.

(21) Appl. No.: 10/222,831

(22) Filed: Aug. 19, 2002

(65) Prior Publication Data

US 2003/0182516 A1 Sep. 25, 2003

(30) Foreign Application Priority Data

Mar. 20, 2002 (JP) ...................................... P2002-077499

(51) Int. Cl.$^7$ .............................................. G06F 12/00
(52) U.S. Cl. ...................... 711/148; 711/112; 711/114; 711/147; 711/170; 711/202; 710/8; 710/14; 710/29; 710/38; 710/52; 710/305; 710/316; 710/317; 709/213; 709/214; 709/218; 709/229; 709/239; 709/249; 709/250; 707/10
(58) Field of Search ................................ 711/112, 114, 711/147, 148, 170, 202; 710/8, 14, 29, 38, 52, 305, 316, 317; 709/213, 214, 218, 229, 239, 249, 250; 707/10

(56) References Cited

U.S. PATENT DOCUMENTS 5,155,845 A * 10/1992 Beal et al. ...................... 714/6
6,216,179 B1 * 4/2001 Murata et al. .................. 710/8

6,457,098 B1 * 9/2002 DeKoning et al. .......... 711/114
2002/0083299 A1 * 6/2002 Van Huben et al. .......... 712/29
2002/0095549 A1 * 7/2002 Matsunami et al. ........ 711/114
2003/0130833 A1 * 7/2003 Brownell et al. ............. 703/23

FOREIGN PATENT DOCUMENTS

JP          2001-256003       3/2000

OTHER PUBLICATIONS

U.S. patent application No. 10/067,332 filed Feb. 7, 2002, Fujimoto et al, "Storage System, Disk Control Cluster and a Method of Increasing of Disk Control Cluster".

* cited by examiner

Primary Examiner—Donald Sparks
Assistant Examiner—Bao Q Truong
(74) Attorney, Agent, or Firm—Reed Smith LLP; Stanley P. Fisher, Esq.; Juan Carlos A. Marquez, Esq.

(57)            ABSTRACT

The storage system includes disk control clusters. Each cluster has channel IF units, disk IF units and local shared memory units. The channel IF units, disk IF units and local shared memory units in the plurality of disk control clusters are connected to each other across the disk control clusters by interconnection, global information control unit for storing management information about the disk control clusters is connected to the interconnection. Host computers and the channel IF units of the disk control clusters are connected via front-end switch for storing copy of the management information. Since the front-end switch reflects the contents of the copy of the management information on routing table, an access request from the host computer can be sent to a suitable disk control cluster.

26 Claims, 22 Drawing Sheets

FIG.16

(BEFORE AN INCREASE OF A CLUSTER)

| GSW PORT NUMBER | CLUSTER NUMBER |
|---|---|
| 0 | 0 |
| 1 | 1 |
| 2 | 3 |
| 3 | 2 |
| 4 | NOT CONNECTED |
| 5 | 4 |
| 6 | NOT CONNECTED |
| 7 | NOT CONNECTED |

400:CORRESPONDING TABLE BETWEEN A GSW PORT AND A CLUSTER NUMBER (AFTER AN INCREASE OF A CLUSTER)

| GSW PORT NUMBER | CLUSTER NUMBER |
|---|---|
| 0 | 0 |
| 1 | 1 |
| 2 | 3 |
| 3 | 2 |
| 4 | 5 |
| 5 | 4 |
| 6 | NOT CONNECTED |
| 7 | NOT CONNECTED |

400:CORRESPONDING TABLE BETWEEN A GSW PORT AND A CLUSTER NUMBER

FIG.17

(BEFORE AN INCREASE OF A CLUSTER)

| CLUSTER NUMBER (402) | LOGICAL VOLUME NUMBER (406) |
|---|---|
| 0 | 0~4095 |
| 1 | 4096~6143 |
| 2 | 12288~16383 |
| 3 | 6144~12287 |
| 4 | 16384~16639 |
| 5 | NA |
| 6 | NA |
| 7 | NA |

405:CORRESPONDING TABLE BETWEEN A CLUSTER NUMBER AND A LOGICAL VOLUME NUMBER (AFTER AN INCREASE OF A CLUSTER)

| CLUSTER NUMBER (402) | LOGICAL VOLUME NUMBER (406) |
|---|---|
| 0 | 0~4095 |
| 1 | 4096~6143 |
| 2 | 12288~16383 |
| 3 | 6144~12287 |
| 4 | 16384~16639 |
| 5 | 16640~20735 |
| 6 | NA |
| 7 | NA |

405:CORRESPONDING TABLE BETWEEN A CLUSTER NUMBER AND A LOGICAL VOLUME NUMBER

FIG.18

| CLUSTER NUMBER 511 | CHANNEL NUMBER 512 | LOGICAL VOLUME NUMBER 513 | CHANNEL STATUS 514 |
|---|---|---|---|
| 0 | 0 | 0000~007F | 1 |
| 0 | 1 | 0080~00FF | 1 |
| 0 | 2 | 0100~01FF | 1 |
| 0 | 3 | 0200~02FF | 1 |
| 1 | 4 | 0300~033F | 1 |
| 1 | 5 | 0340~03FF | 1 |
| 1 | 6 | 0400~04FF | 1 |
| 1 | 7 | 0300~033F | 1 |
| ⋮ | ⋮ | ⋮ | ⋮ |
| 7 | 1C | 1000~10FF | 1 |
| 7 | 1D | 1100~12FF | 1 |
| 7 | 1E | 1300~14FF | 1 |
| 7 | 1F | 1500~17FF | 0 |

500: INDICATION TABLE FOR SYSTEM CONFIGURATION AND OPERATION STATUS

FIG.19

| HOST COMPUTER NUMBER | LOGICAL VOLUME NUMBER | CHANNEL NUMBER | CLUSTER NUMBER |
|---|---|---|---|
| 0 | 0000~007F | 0 | 0 |
| 1 | 0080~00FF | 1 | 0 |
| 1 | 0340~03FF | 5 | 1 |
| 2 | 0100~01FF | 2 | 0 |
| 3 | 0200~02FF | 3 | 0 |
| 4 | 0300~033F | 4 | 1 |
| 5 | 0400~04FF | 6 | 1 |
| 6 | 0300~033F | 7 | 1 |
| ⋮ | ⋮ | ⋮ | ⋮ |
| 1C | 1000~10FF | 1C | 7 |
| 1D | 1100~12FF | 1D | 7 |
| 1E | 1300~14FF | 1E | 7 |
| 1F | 1500~17FF | 1F | 7 |

600: CORRESPONDING TABLE BETWEEN A HOST COMPUTER NUMBER AND A LOGICAL VOLUME NUMBER

FIG.20

| CLUSTER NUMBER | CHANNEL NUMBER | LOGICAL VOLUME NUMBER | CHANNEL STATUS |
|---|---|---|---|
| 0 | 0 | 0000~007F | 1 |
| 0 | 1 | 0080~00FF | 1 |
| 0 | 2 | 0100~01FF | 2 |
| 0 | 3 | 0200~02FF | 1 |
| 1 | 4 | 0300~033F | 1 |
| 1 | 5 | 0340~03FF | 1 |
| 1 | 6 | 0400~04FF | 1 |
| 1 | 7 | 0300~033F | 1 |
| ⋮ | ⋮ | ⋮ | ⋮ |
| 7 | 1C | 1000~10FF | 1 |
| 7 | 1D | 1100~12FF | 1 |
| 7 | 1E | 1300~14FF | 1 |
| 7 | 1F | 1500~17FF | 0 |

500: INDICATION TABLE FOR SYSTEM CONFIGURATION AND OPERATION STATUS

FIG.21

| CLUSTER NUMBER | CHANNEL NUMBER | LOGICAL VOLUME NUMBER | CHANNEL STATUS | |
|---|---|---|---|---|
| 0 | 0 | 0000~007F | 1 | |
| 0 | 1 | 0080~00FF | 1 | 551 |
| 0 | 2 | 0100~017F | 1 | |
| 0 | 3 | 0200~02FF | 1 | |
| 1 | 4 | 0300~033F | 1 | |
| 1 | 5 | 0340~03FF | 1 | |
| 1 | 6 | 0400~04FF | 1 | |
| 1 | 7 | 0300~033F | 1 | |
| ⋮ | ⋮ | ⋮ | ⋮ | |
| 7 | 1C | 1000~10FF | 1 | |
| 7 | 1D | 1100~12FF | 1 | |
| 7 | 1E | 1300~14FF | 1 | 552 |
| 7 | 1F | 0180~01FF | 1 | |
| 7 | 1F | 1500~17FF | 1 | |

500: INDICATION TABLE FOR SYSTEM CONFIGURATION AND OPERATION STATUS

FIG.22

| HOST COMPUTER NUMBER | LOGICAL VOLUME NUMBER | CHANNEL NUMBER | CLUSTER NUMBER |
|---|---|---|---|
| 0 | 0000~007F | 0 | 0 |
| 1 | 0080~00FF | 1 | 0 |
| 1 | 0340~03FF | 5 | 1 |
| 2 | 0100~017F | 2 | 0 |
| 2 | 0180~01FF | 1F | 7 |
| 3 | 0200~02FF | 3 | 0 |
| 4 | 0300~033F | 4 | 1 |
| 5 | 0400~04FF | 6 | 1 |
| 6 | 0300~033F | 7 | 1 |
| ⋮ | ⋮ | ⋮ | ⋮ |
| 1C | 1000~10FF | 1C | 7 |
| 1D | 1100~12FF | 1D | 7 |
| 1E | 1300~14FF | 1E | 7 |
| 1F | 1500~17FF | 1F | 7 |

600: CORRESPONDING TABLE BETWEEN A HOST COMPUTER NUMBER AND A LOGICAL VOLUME NUMBER

STORAGE SYSTEM, DISK CONTROL CLUSTER, AND ITS INCREASE METHOD

CROSS-REFERENCE TO RELATED APPLICATIONS

The present invention relates to U.S. patent application Ser. No. 10/067,332 entitled STORAGE SYSTEM, DISK CONTROL CLUSTER AND A METHOD OF INCREASING OF DISK CONTROL CLUSTER filed by K. FUJIMOTO et al. on Feb. 7, 2002 and U.S. patent application Ser. No. 10/212,882 entitled DISK STORAGE SYSTEM HAVING DISK ARRAY CONNECTED TO DISK ADAPTER THROUGH SWITCHES to be filed by K. TANAKA et al. claiming priority under 35 USC 119 of Japanese Patent Application No. 2002-106262.

BACKGROUND OF THE INVENTION

The present invention relates to storage system for storing data in a plurality of disk drives and a disk control cluster forming part of the storage system.

When compared with the I/O performance of a main memory in a computer using a semiconductor storage as a storage medium, the I/O performance of a disk subsystem (which will be referred to as the subsystem, hereinafter) using a magnetic disk as a storage medium is small by about 3 or 4 figures. An effort has conventionally been put into reducing a difference in I/O performance between these semiconductor and disk storages, that is, improving the I/O performance of the subsystem. As one method of improving the I/O performance of the subsystem, there is known a system called a disk array wherein a subsystem is made up of a plurality of disk drives for storing data therein.

As shown in FIG. 2, for example, a prior art includes a plurality of channel IF units 11 for executing data transfer between host computers 3 and disk controllers 4, a plurality of disk IF units 16 for executing data transfer between disk drives 2 and the disk controllers 4, and shared memory units 20 for storing therein the data of the disk drives and control information on the disk controllers 4 (e.g., information relating to data transfer control within the disk controllers 4 and information for management of data to be stored in the disk drives 2). In each of the disk controllers 4, all the shared memory units 20 are arranged to be accessible by all the channel IF units 11 and disk IF units 16. In each disk controller 4, the channel IF units 11 and the disk IF units 16 are connected with the shared memory units 20 by an interconnection 30.

Each channel IF unit 11 has an interface for connection with the host computers 3 and a microprocessor (not shown) for controlling input and output from and to the host computers 3. Each disk IF unit 16 has an interface for connection with the associated disk drive 2 and a microprocessor (not shown) for controlling input and output from and to the disk drive 2. Each disk IF unit 16 also executes a RAID function.

Spread of the Internet involves radical increase of data to be handled in companies or firms, and thus it is necessary that a data center or the like store data beyond a data amount capable of being handled by a single disk controller. To this end, a plurality of such disk controllers 4 are installed to be connected with the host computers 3 via a SAN switch 5 as an interface with the host computers 3 as shown in FIG. 2.

Further, as the increase of the data amount involves increase of the number of such disk controllers 4 to be connected to the SAN switch 5, the management of the entire system (which is called the storage area network (SAN)) including the host computers 3 and SAN switch 5 becomes complicated. To cope with it, a SAN appliance 6 is connected to the SAN switch 5 to perform directory service over data to be managed by all the disk controllers 4 connected to the SAN switch 5 and to perform such operation that the host computers 3 look the plurality of disk controllers 4 like a single storage system. In other words, the SAN appliance 6 causes the host computers 3 to look storage areas offered by the disk controllers 4 like a single large storage area, and assigns necessary amounts of such a storage area to the host computers 3.

In another prior art as disclosed in JP-A-2001-256003, as shown in FIG. 23, a single storage system 1 is made up of a plurality of disk control clusters 1-1 to 1-n. Each disk control cluster includes a plurality of channel IF units 11 for executing data transfer between the associated host computer 3 and the associated disk control cluster, a plurality of disk IF units 16 for executing data transfer between the associated disk drive 2 and the associated disk control cluster, and shared memory units 25. An interconnection 31 is connected between the channel IF units 11, disk IF units 16 and shared memory units 25 in a plurality of disk control clusters 1-1 to 1-n. Stored in the shared memory units 25 are control information on the storage system. The shared memory units 25 are arranged so that the shared memory units can be accessed by all the channel IF units 11 and disk IF units 12 via an interconnection 31, so that exchange of the control information via the shared memory units 25 enables the plurality of disk control clusters to operate as a single storage system.

In large-scale companies such as typical banks, securities companies and telephone companies, computers and storages so far dispersed into local places tend to be centralized into a data center to form a computer system/storage system configuration, thus reducing costs necessary for the operation, maintenance and management of the computer system and storage system.

In such a tendency, a large-scale/high-end disk controller is required to support a channel interface for connection with hundreds of host computers (connectivity) and to support a storage capacity of hundreds of tera-bytes or more.

Meanwhile, with expansion of open market and spread of the storage area network (SAN) in these years, demands of appearance of disk controllers of a small-scale configuration (small-scale rack) with rich functions/high reliability similar to the large-scale/high-end disk controller have been stronger.

For the former demand, it is considered to connect a plurality of such conventional large-scale/high-end disk controllers to form a huge storage configuration.

For the latter demand, it is considered to minimize its rack in a minimum configuration model of the conventional large-scale/high-end disk controller. When a plurality of such minimized controllers are connected, further, a storage system is considered which can support a medium-to-large scaled configuration supported by the conventional disk controller.

As has been mentioned above, a storage system is required to have a small- to huge-scale configuration compatible with a reliable architecture with a good scalability. To this end, such a storage system is required that a plurality of disk controllers can be clustered and be operated as a single system.

In the prior art shown in FIG. 2, the plurality of disk controllers 4 are connected to the host computers 3 via the SAN switch 5 so that the SAN appliance 6 causes the host computers 3 to look the disk controllers 4 like a single storage system.

However, the prior art has a problem that, since the plurality of disk controllers 4 are operated as a single system under control of software operating on the SAN appliance 6, the prior art is lower in reliability and availability than the conventional single large-scale disk controller. Another problem is that, since the SAN appliance 6 searches the disk controllers 4 for data present therein and demanded by the host computers 3, the performance of the prior art becomes low.

When an error occurs in the channel IF units 11 of one disk controller 4 and it become impossible to access data of the disk drive connected to this disk controller, furthermore, it becomes necessary to once stop the access from the host computer 3 to the disk controller 4 and to exchange the channel IF unit 11, with the result that this disadvantageously affects an application program running under control of the host computer 3.

The prior art shown in FIG. 23 provides a storage system with a high scalability wherein the plurality of disk control clusters exchange control information via the shared memory units 25 and operate as a single storage system.

This prior art however has a defect that its bad handleability to users. In other words, in order to enhance the performance, it is necessary that a storage area to be assigned to the host computer 3 be a storage area on the disk drive 2 connected to the disk control cluster connected with the host computer 3. Further, for the purpose of preventing impossible access to the disk control cluster due to an interface error between the host computer 3 and disk control cluster, it becomes necessary to connect connection paths from one host computer to the plurality of disk control clusters. In addition, even when the plurality of connection paths are connected, it is impossible to perform switching between the connection paths without notifying it to the host computer.

SUMMARY OF THE INVENTION

It is therefore an object of the present invention to provide a storage system with a good scalability which can be compatible with an identical high reliability/high performance architecture from a small scale configuration to a huge scale configuration.

A specific object of the present invention is to provide a storage system into which a plurality of disk controllers are combined and has a high reliability, high performance and good handleability.

The above object is attained by providing a storage system which includes a plurality of disk control clusters, each of the plurality of disk control clusters having one or a plurality of channel interface units having interfaces with host computers, one or a plurality of disk interface units having interfaces with disk drives, and a local shared memory unit for storing data to be read/written from/to the disk drives, control information about transfer of data and management information about the disk drives, the channel interface units executing data transfer between the interfaces with the host computers and the local shared memory units in response to a read/write request from the host computers, the disk interface units executing data transfer between the disk drives and the local shared memory units to read/write the data;

a global information control unit for storing the data to be read/written from/to the disk drives and the management information about the disk control clusters;

an interconnection connected between the plurality of disk control clusters; and a switch for connecting the channel interface units in the plurality of disk control clusters, wherein the switch has a memory to which the management information stored in the global information control unit is copied.

The above object is further attained by providing a storage system wherein connection units for connecting the channel interface units, the disk interface units and the local shared memory unit in one of the disk control clusters are connected to corresponding connection units of the other disk control clusters by means of the interconnection, and the global information control unit is connected to the interconnection and the switch.

The object is attained also by providing a storage system wherein the channel interface units and the disk interface units are directly connected to the local shared memory unit in each of the disk control clusters, the local shared memory unit in the disk control cluster is connected to the local shared memory units in the other disk control clusters by means of the interconnection, and the global information control unit is connected to the interconnection and the switch.

The object is attained also by providing a storage system wherein the channel interface units and the disk interface units are connected directly to the local shared memory unit in each of the disk control clusters, connection units for connecting the channel connection units and the disk interface units in one of the disk control clusters are connected to corresponding connection units of the other disk control clusters by means of the interconnection, and the global information control unit is connected to the interconnection and the switch.

The object is attained also by providing a storage system which includes, a plurality of disk control clusters, each of the plurality of disk control clusters having one or a plurality of channel interface units having interfaces with host computers, one or a plurality of disk interface units having interfaces with disk drives, and a local shared memory unit for storing data to be read/written from/to the disk drives, control information about transfer of data and management information about the disk drives, the channel interface units executing data transfer between the interfaces with the host computers and the global information control unit in response to a read/write request from the host computers, the disk interface units executing data transfer between the disk drives and the global information control unit to read/write the data;

an interconnection connected between the plurality of disk control clusters; and a switch for connecting the channel interface units in the plurality of disk control clusters, wherein the switch has a memory to which the management information stored in the global information control unit is copied.

The object is attained also by providing a storage system wherein connection units for connecting the channel interface units and the disk interface units in one of the disk control clusters are connected to corresponding connection units of the other disk control clusters by means of the interconnection, and the global information control unit is connected to the switch by means of the interconnection.

The object is attained also by providing a storage system which includes a plurality of disk control clusters, each of the plurality of disk control clusters having one or a plurality of channel interface units having interfaces with host computers, one or a plurality of disk interface units having interfaces with disk drives, and a local shared memory unit having first and second memories, the first memory storing data to be read/written from/to the disk drives, the second memory storing control information about data transfer between the channel interface units and the disk interface units and the first memory and also storing management information about the disk drives, the channel interface units executing the data transfer between the interfaces with the host computers and the first memory of the local shared memory units in response to a read/write request from the host computers, the disk interface units executing the data transfer between the disk drives and the first memory of the local shared memory units to read/write the data;

a global information control unit for storing management information about the disk control clusters;

two first and second different interconnections for interconnecting the plurality of disk control clusters; and a switch for connecting the channel interface units in the plurality of disk control clusters, wherein the switch has a memory to which the management information stored in the global information control unit is copied.

The object is attained also by providing a storage system wherein the channel interface units and the disk interface units in each of the disk control clusters are connected directly to the second memory in the local shared memory unit in the disk control cluster, first connection units for connecting the channel interface units and the disk interface units in one of the disk control clusters are connected to corresponding first connection units of the other disk control clusters via the first interconnection, second connection units for connection the channel interface units, the disk interface units and the first memory of the local shared memory unit in one of the disk control clusters are connected to corresponding second connection units of other disk control clusters via the second interconnection and the global information control unit is connected to the first interconnection and the switch.

Other objects of the present application and how to solve the objects will become apparent from the DETAILED DESCRIPTION OF THE EMBODIMENTS and the attached drawings.

BRIEF DESCRIPTION OF THE DRAWINGS

FIG. 16 shows an example of configuration information of the storage system stored in a global information control unit;

FIG. 17 shows another example of the configuration information of the storage system stored in a global information control unit;

FIG. 18 shows an example of configuration/operation status of the storage system stored in the global information control unit;

FIG. 19 shows an example of a table for switch change-over control stored in a front-end switch;

FIG. 20 shows another example of the configuration/operation status of the storage system stored in the global information control unit;

FIG. 21 shows a further example of the configuration/operation status of the storage system stored in the global information control unit;

FIG. 22 shows another example of the table for switch change-over control stored in the front-end switch;

DETAILED DESCRIPTION OF THE EMBODIMENTS

Embodiments of the present invention will be explained with reference to the accompanying drawings.

Embodiment 1

Embodiments of the present invention are shown in FIGS. 1, 3, 12 and 13.

In the following embodiments, explanation will be made in connection with an example wherein a switch is used as an interconnection. However, a bus as an example may be employed so long as it can be interconnected to perform transfer of configuration information or data.

Figure 1:
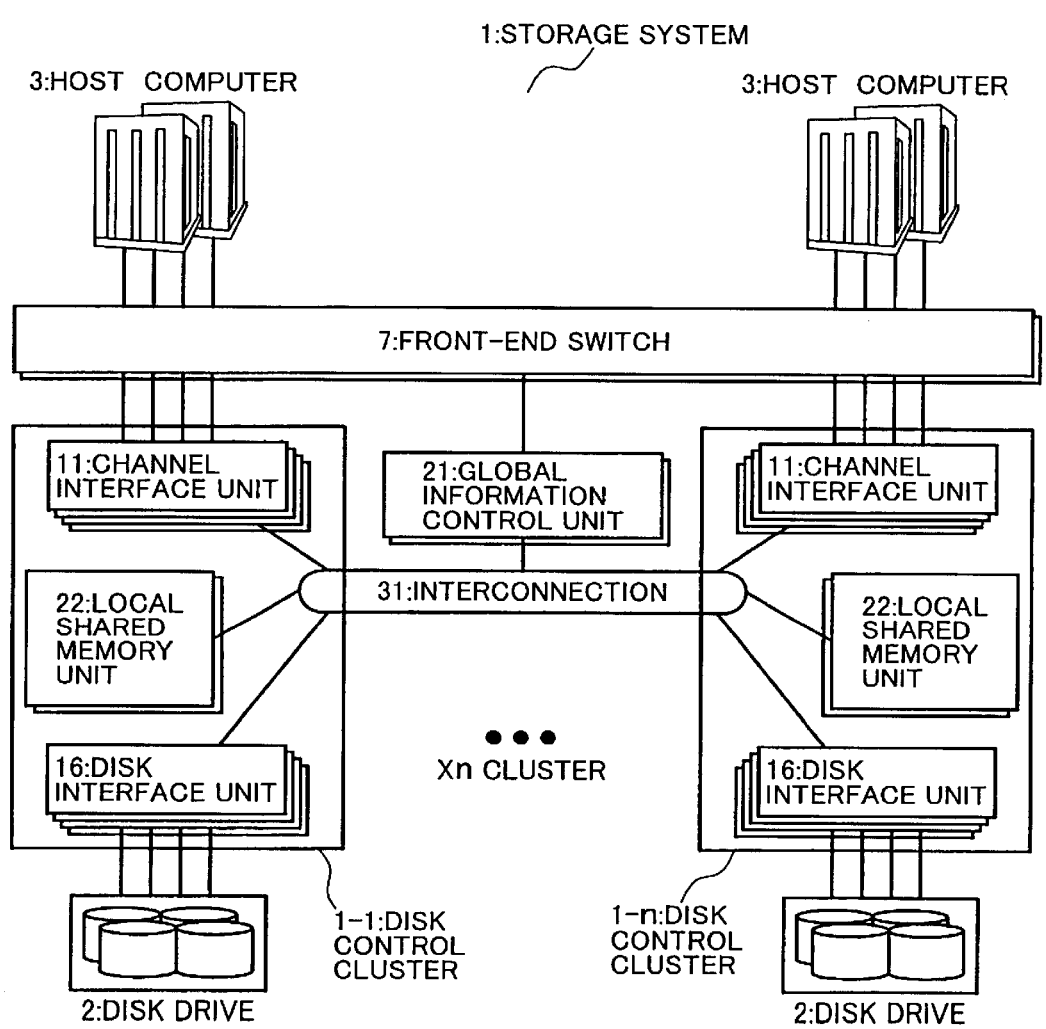
FIG. 1 shows an arrangement of a storage system in accordance with an embodiment 1 of the present invention.
Figure 2:
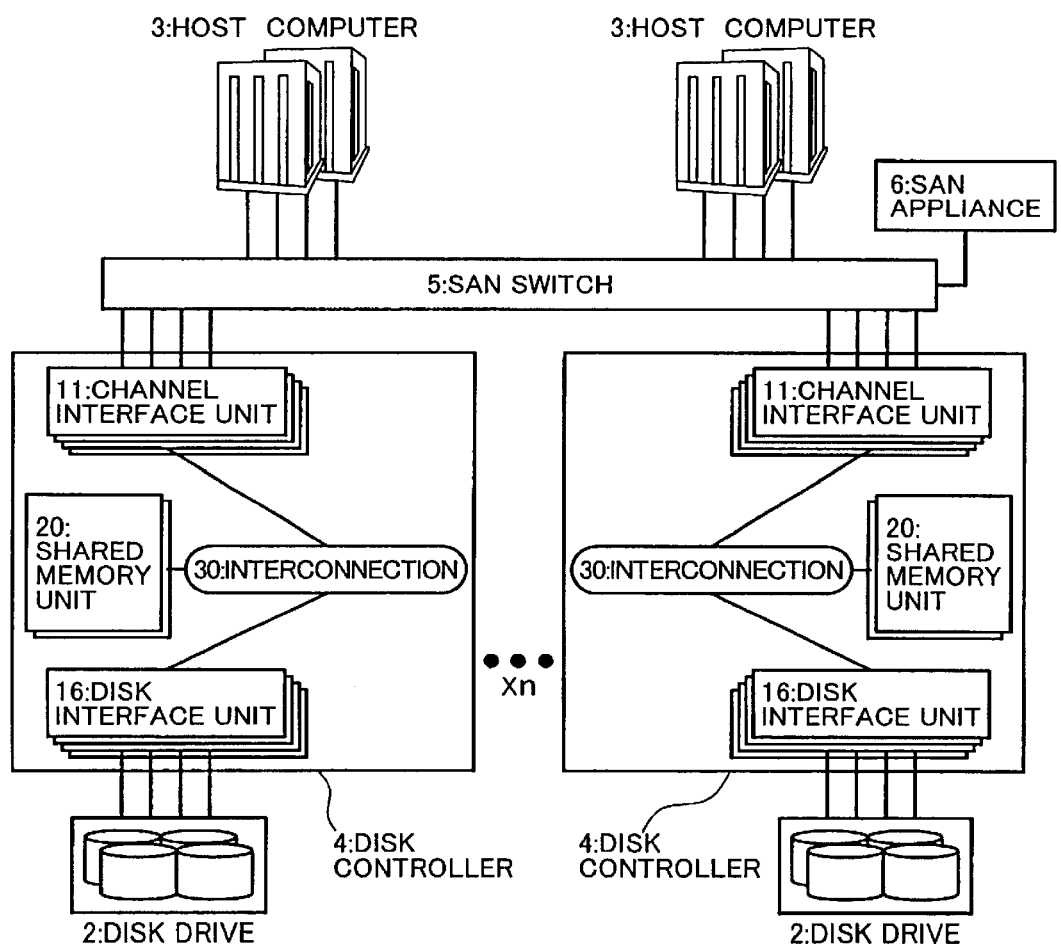
FIG. 2 shows a structure of a plurality of disk controllers in a prior art.

As shown in FIG. 1, a storage system 1 includes a plurality of disk control clusters 1-1 to 1-n and a front-end switch 7.

The disk control cluster 1-1 has interface units (channel interface units) 11 with an associated host computer 3, interface units (disk IF units) 16 with disk drives 2, and local shared memory units 22. An interconnection 31 across the disk control clusters 1-1 to 1-n are connected between the channel IF units 11, disk IF units 16 and local shared memory units 22. A global information control unit 21 is connected to the interconnection 31. That is, the storage system is arranged to be accessed from all the channel IF units 11 and disk IF units 16 to the global information control unit 21 via the interconnection.

The host computers 3 are connected to the disk control clusters via the front-end switch 7 so that any of the host computers 3 can access any of the disk control clusters.

Figure 12:
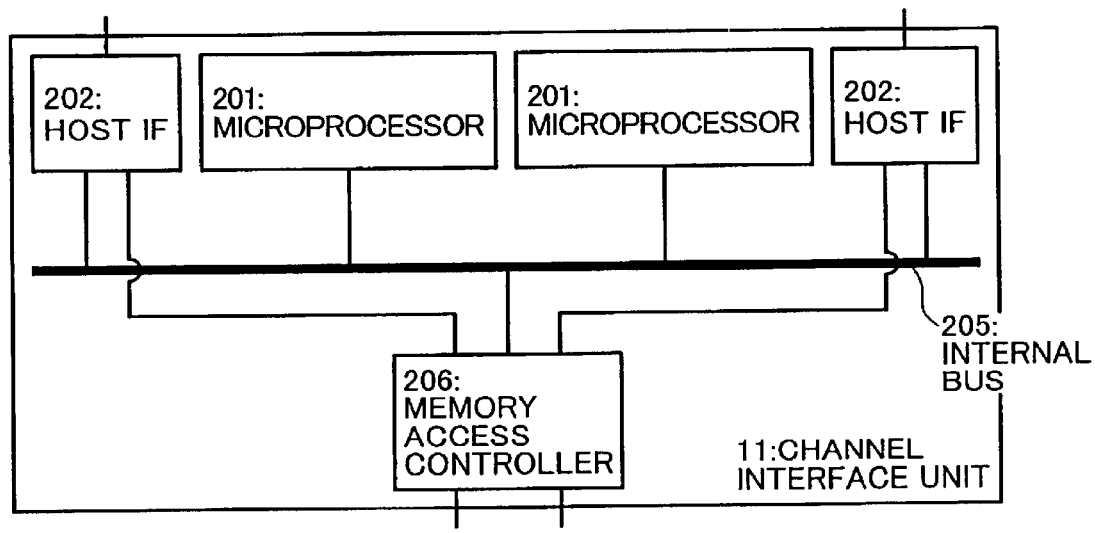
FIG. 12 shows a structure of a channel interface unit forming the storage system of the present invention.

A specific example of each of the channel IF units 11 is shown in FIG. 12.

The channel IF unit 11 has two IFs (host IFs) 202 with the associated host computer 3, two microprocessors 201 for controlling input/output to/from the host computer 3, and a memory access controller 206 for controlling an access to the global information control unit 21 or to the local shared memory units 22. The channel IF unit 11 executes data transfer between the associated host computer 3 and global information control unit 21 or local shared memory units 22 and transfer of configuration information between the microprocessors 201 and global information control unit 21 or local shared memory units 22. The microprocessors 201 and host IFs 202 are interconnected by an internal bus 205, and the memory access controller 206 is directly connected to the two host IFs 202 and also to the internal bus 205.

Figure 13:
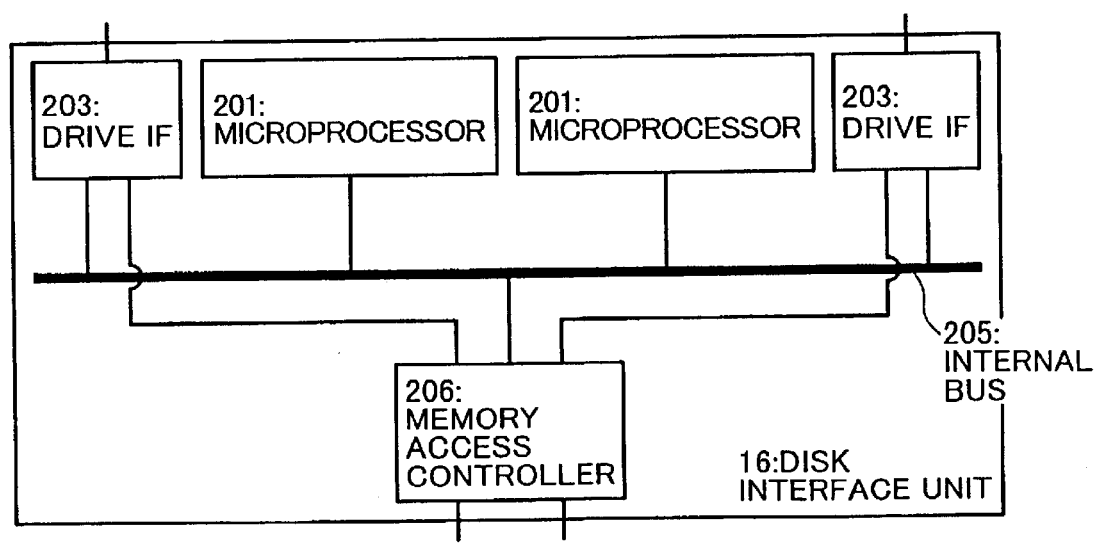
FIG. 13 shows a structure of a disk interface unit forming the storage system of the present invention.

A specific example of a structure of each of the disk IF units 16 is shown in FIG. 13.

The disk IF unit 16 has two interfaces (IFs) (drive IFs) 203 with the associated disk drive 2, two microprocessors 201 for controlling input/output to/from the disk drive 2, and an access control unit (memory access controller) 206 for controlling an access to the global information control unit 21 or to the local shared memory units 22. The disk IF unit 16 executes data transfer between the disk drive 2 and the global information control unit 21 or local shared memory units 22 and transfer of configuration information between the microprocessors 201 and the global information control unit 21 or local shared memory units 22. The microprocessors 201 and the drive IFs 203 are interconnected by the internal bus 205, the memory access controller 206 are connected directly to the two drive IFs 203 and also to the internal bus 205. The disk IF unit 16 also executes a RAID function.

One disk control cluster may be configured as a single rack or a module, but itself must have a function as a single disk controller.

Figure 3:
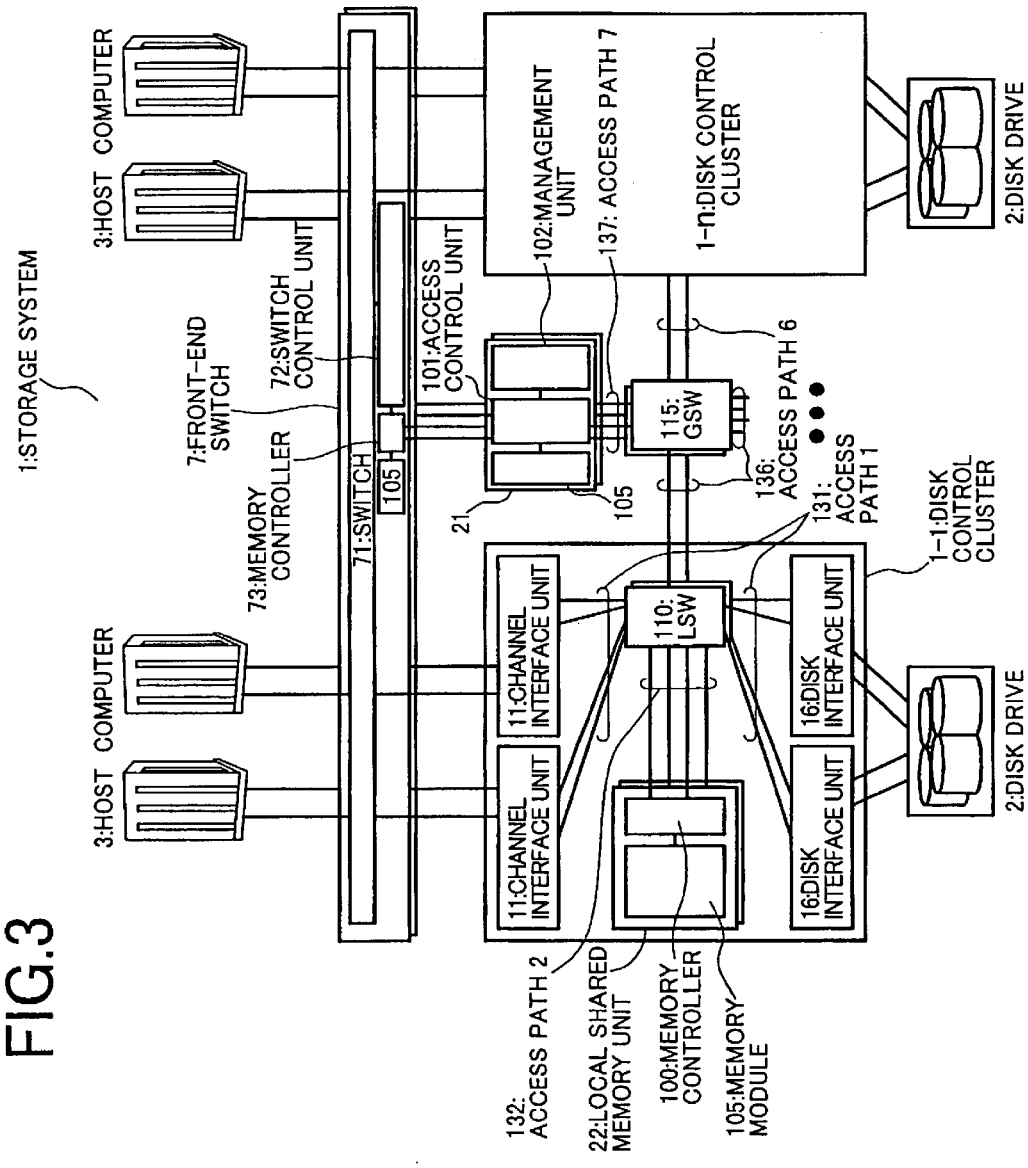
FIG. 3 shows a detailed arrangement of the storage system of the embodiment 1 of FIG. 1.

A specific example of the storage system is shown in FIG. 3.

The storage system 1 includes two front-end switches 7, a plurality of disk control clusters 1-1 to 1-n, a global information control unit 21, two global switches (GSWs) 115, access paths 136, and access paths 137.

The global switches (GSWs) 115 function as connection units which connect the paths from the global information control unit 21 and the paths from a plurality of disk control clusters.

Each of the disk control clusters 1-1 to 1-n has two channel IF units 11 with host computers 3, two disk IF units 16 with the associated disk drives 2, two local switches (LSWs) 110, two local shared memory units 22, access paths 131, access paths 132 and access paths 136.

Each of the front-end switches 7 has a switch 71, a switch control unit 72, a memory controller 73, and a memory module 105.

Each of the host computers 3 is connected by each one path to the two switches 71 of the two front-end switch 7, and the switches 71 are connected by each one path to disk control clusters 1-1 to 1-n.

Each of the global information control units 21 has an access control unit 101, a management unit 102, and a memory module 105. The global information control unit 21 stores information about management of the disk control clusters 1-1 to 1-n (including, e.g., information on storage areas to be managed by the disk control clusters, information on loads, errors and configurations of respective parts in the disk control clusters).

Each of the local switches (LSWs) 110 is a connection unit which connects the paths from the channel IF units 11, the paths from disk IF unit 16, and the paths from the local shared memory units 22.

Each of the local shared memory units 22 has a memory controller 100 and a memory module 105. The local shared memory unit 22 stores control information about the disk control clusters (including, e.g., information on control of data transfer between the channel IF units 11 and disk IF units 16 and the local shared memory units 22 and management information about data to be recorded in the associated disk drives 2) as well as the data to be recorded in the disk drives 2.

The memory access controllers 206 in the channel IF units 11 are connected to the respective two different LSWs 110 by means of the two access paths 131.

The LSWs 110, which have two access paths 132, are connected to the respective memory controllers 100 in the two different local shared memory units 22 by means of the paths 132.

Accordingly, the memory controller 100 has a total of two access paths 132 connected with the two LSWs 110.

Thus one memory access controller 206 can have two access routes to one memory controller 100.

As a result, even when an error takes place in one of the access paths or LSWs 110, an access to the local shared memory units 22 can be allowed via the other access route, thus enabling improvement in a fault tolerance.

Each of the LSWs 110 has a total of four access paths 131 of two connected from the two channel IF units 11 and two connected from the disk IF units 16.

Each LSW 110 also has the two access paths 132 connected to the two local shared memory units 22 and one access path 136 connected to the global switch (GSW) 115.

Since the LSW 110 has such access paths as connected in the aforementioned manner, the LSW 110 has a function of routing requests issued from the four access paths from the channel IF units 11 and disk IF units 16 to the two the access paths leading to the local shared memory units 22 within the own disk control cluster and to one access path 136 leading to the global switch (GSW) 115.

The global switch (GSW) 115 has access paths 136 connected to the disk control clusters and corresponding in number to the number thereof.

The global switch (GSW) 115 also has a total of two access paths each connected to each of the access control units 101 within the two global information control units 21.

In this way, one memory access controller 206 can have two access routes connected therefrom to one access control unit 101.

As a result, even when an error occurs in one of the access paths, LSW 110 or global switch (GSW) 115, an access can be allowed to the global information control unit 21 via the other access route, with the result that a fault tolerance can be improved.

Even when the global switch (GSW) 115 is not used and the access paths 136 are directly connected to the access control unit 101, this will involve no problem from the viewpoint of embodying the present invention. As a result, an overhead for data transfer processing caused by the global switch (GSW) 115 can be reduced and thus its performance can be improved.

When no global switch (GSW) 115 is used, for the purpose of securing two access routes from one memory access controller 206 to one access control unit 101 to improve a fault tolerance, two of the access paths 136 are provided to the LSW 110 to be connected with the different access control units 101.

The global switches (GSWs) 115 have two paths connected to the memory controllers 73 within the two front-end switches 7.

Connected to the memory controller 73 within the front-end switch 7 are the switch control unit 72 and the memory module 105.

The switch control unit 72, which is connected to the switch 71, refers to a routing table showing channel connections between the channels of the host computers 3 and the channels of the disk control clusters and stored in the memory module 105, and controls the change-over of the switch.

Further, the memory module 105 in the front-end switch 7 has a copy of information, within the global information control unit 21, about loads, errors and addresses for storage areas of parts within the disk control clusters 1-1 to 1-n, and the switch control unit 72 modifies the routing table on the basis of these information periodically or as necessary.

More specifically, the global information control unit 21 stores such a system configuration/operation status table 500 as shown in FIG. 18 in the memory module 105 therein, and the front-end switch 7 stores a copy of the table 500 in the memory module 105.

The system configuration/operation status table 500 contains cluster numbers 511 for identification of the disk control clusters, logical volume numbers 513 associated with channel numbers 512 for identification of the channels of the disk control clusters and channel operation status 514 associated therewith.

In the present embodiment, the cluster number 511, channel number 512 and logical volume number 513 are expressed in hexadecimal notation. The channel operation status 514 represents a low load condition by '0', a medium load condition by '1', a high load condition by '2', and an error by '3'.

The front-end switch 7 stores a host/logical volume correspondence table 600 in the memory module 105 provided therein.

The host/logical volume correspondence table 600 contains logical volume numbers 513 associated with host computer numbers 615 for identification of the respective host computers, that is, logical volumes assigned to the respective host computers, channel numbers 512 for access to the logical volume numbers 513, and cluster numbers 511 of the disk control clusters for management of the logical volumes.

As the host computer number 615, it is considered to use a worldwide name (WWN) used in the protocol of fiber channel or a MAC or IP address used in the internet protocol.

The switch control unit 72 refers to the host/logical volume correspondence table 600 (routing table) and performs switching operation over the switch 71.

In FIG. 3, the LSW 110 is a connection unit which connects the channel IF units 11, disk IF units 16 and local shared memory units 22, while the global switch (GSW) 115 is a connection unit which connects the disk control clusters 1-1 to 1-n and global information control units 21.

In FIG. 3, the global switches (GSWs) 115 and global information control units 21 may be mounted in a box, the front-end switch 7 may be mounted in another box, and these boxes may be mounted in a single rack together with the disk control clusters 1-1 to 1-n each in the form of a module. Further, the disk control clusters 1-1 to 1-n may be mounted in separate racks and located as distributed at locations distantly away.

In FIG. 3, explanation will be made in connection with an example wherein the host computer 3 reads out data recorded in the storage system 1.

The host computer 3 first issues a data read request to the storage system 1.

The request is accepted by the front-end switch 7 so that the switch control unit 72 within the front-end switch 7 analyzes the header of a request packet.

The number (host computer number) of the host computer as a request issuer and the logical volume number having the request data recorded therein are stored in the header of the request packet. The switch control unit 72 refers to the host/logical volume correspondence table 600, connects the port of the switch 71 connected with the host computer as the request issuer to the port of the switch 71 having a channel number assigned to the corresponding logical volume number, and sends the request packet to the disk control cluster.

The microprocessor 201 within the channel IF unit 11 connected with the request-sent channel accesses the local shared memory unit 22 within the own disk control cluster 1-1, and examines one of the disk drives 2 in which the requested data is stored.

Since a conversion table showing the address of the request data associated with the address of the disk drive 2 having the data actually recorded therein is stored in the local shared memory units 22, the microprocessor 201 can examine one of the disk drives 2 having the requested data stored therein.

Further, the microprocessor 201 of the channel IF unit 11 after receiving the request accesses the local shared memory unit 22 within its own disk control cluster 1-1, and confirms whether or not the requested data is already stored in the local shared memory unit 22.

Since the directory of the data is stored in the local shared memory unit 22 together with data to be stored in the disk drive 2, the microprocessor can confirm the presence or absence of the request data in the local shared memory unit 22.

When the microprocessor detects the presence of the data in the local shared memory unit 22 of the own disk control cluster 1-1, it accesses the local shared memory unit 22, transfers the data to the channel IF unit 11 via its own LSW 110, and sends it to the host computer 3 via the front-end switch 7.

When the microprocessor 201 of the channel IF unit 11 fails to detect the presence of the data in the local shared memory unit 22 of the own disk control cluster 1-1, the microprocessor issues control information indicative of the processing contents of a data request of reading the request data and storing it in the local shared memory unit 22, the microprocessor 201 of the disk IF unit 16 when receiving the issued control information reads out the data from the disk drive 2 having the request data already stored therein, transfers the request data to the local shared memory unit 22 of the own disk control cluster 1-1 via the LSW 110, and stores it therein.

That is, the microprocessor 201 of the channel IF unit 11 issues control information indicative of the processing contents of the above data request, and stores it in a control information area (job control block) of the local shared memory unit 22.

The microprocessor 201 of the disk IF unit 16 watches the control information area of the local shared memory unit 22 by polling and, when the above issued control information is present in the above control information area, the microprocessor reads out the data from the disk drive 2 having the request data stored therein, and transfers the request data to the local shared memory unit 22 of the own disk control cluster 1-1 via the LSW 110 to store the data therein.

After the microprocessor 201 of the disk IF unit 16 stores the request data in the local shared memory unit 22, transmits an address at which the data was stored in the local shared memory unit 22 to the microprocessor 201 of the channel IF unit 11 as the issuer of the control information via the control information within the local shared memory unit 22. The microprocessor 201 of the channel IF unit 11 when receiving the address reads out the data from the local shared memory unit 22 and transmits the read data to the host computer 3 via the front-end switch 7.

That is, the microprocessor 201 of the disk IF unit 16 after storing the request data in the local shared memory unit 22, issues control information indicative of the end of the processing execution and the data storage address, and stores the control information in the control information area of the local shared memory unit 22.

The microprocessor 201 of the channel IF unit 11 which issued the above control information, watches the control information area of the local shared memory unit 22 by polling, and, when the control information issued from the microprocessor 201 of the disk IF unit 16 is present in the above control information area, the microprocessor reads out the data from the local shared memory unit 22 on the basis of the data storage address in the local shared memory unit, transfers it to the channel IF unit 11 and further sends it to the host computer 3 via the front-end switch 7.

In accordance with the present embodiment, even when the host computer 3 is connected to any of the connection ports of the front-end switch 7, the host computer can write and read data only by issuing an access request to the connection port without need to be conscious of the disk control clusters of the storage system 1. Thus this causes the plurality of disk control clusters 1-1 to 1-n to look like a single storage system to the host computer 3.

And there can be provided a storage system which has a good scalability and handleability, ranging from a small scale configuration including a single disk control cluster to a huge scale configuration including tens of connected disk control clusters, compliant with an architecture having high reliability and performance possessed by the single disk control cluster.

Embodiment 2

An embodiment of the present invention is shown in FIGS. 4, 5, 12 and 13.

Figure 4:
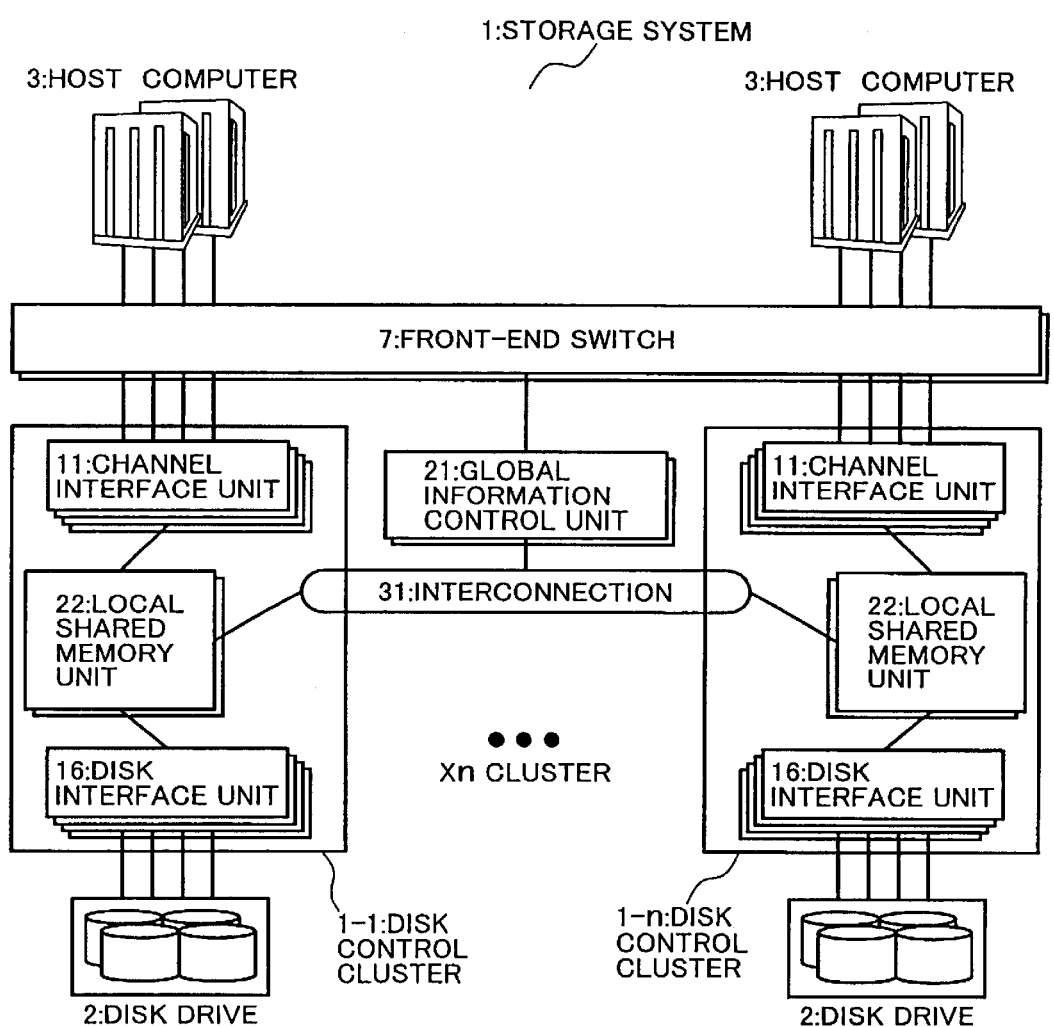
FIG. 4 shows an arrangement of a storage system in accordance with an embodiment 2 of the present invention.

As shown in FIG. 4, the configuration of a storage system 1 including disk control clusters 1-1 to 1-n and front-end switches 7 is the same as that of the embodiment 1 of FIG. 1, except for a connection configuration between channel IF units 11, disk IF units 16, local shared memory units 22 and interconnection 31.

In each of the disk control clusters, the channel IF units 11, disk IF units 16 and local shared memory units 22 are directly interconnected.

An interconnection 31 is wired between the local shared memory units 22 in the plurality of disk control clusters 1-1 to 1-n, and a global information control units 21 are connected to the interconnection 31.

In the present embodiment, as mentioned above, the channel IF units 11, disk IF units 16 and local shared memory units 22 are directly connected in each of the disk control clusters 1-1 to 1-n. As a result, when compared with the case of the embodiment 1 having these units connected by the interconnection 31, the present embodiment can shorten an access time to the local shared memory unit 22.

The structures of the channel IF unit 11 and disk IF unit 16 are substantially the same as those in the embodiment 1 shown in FIGS. 12 and 13.

Each of the disk control clusters may be arranged in the form of a single rack or module, but itself has a function as one disk controller.

Figure 5:
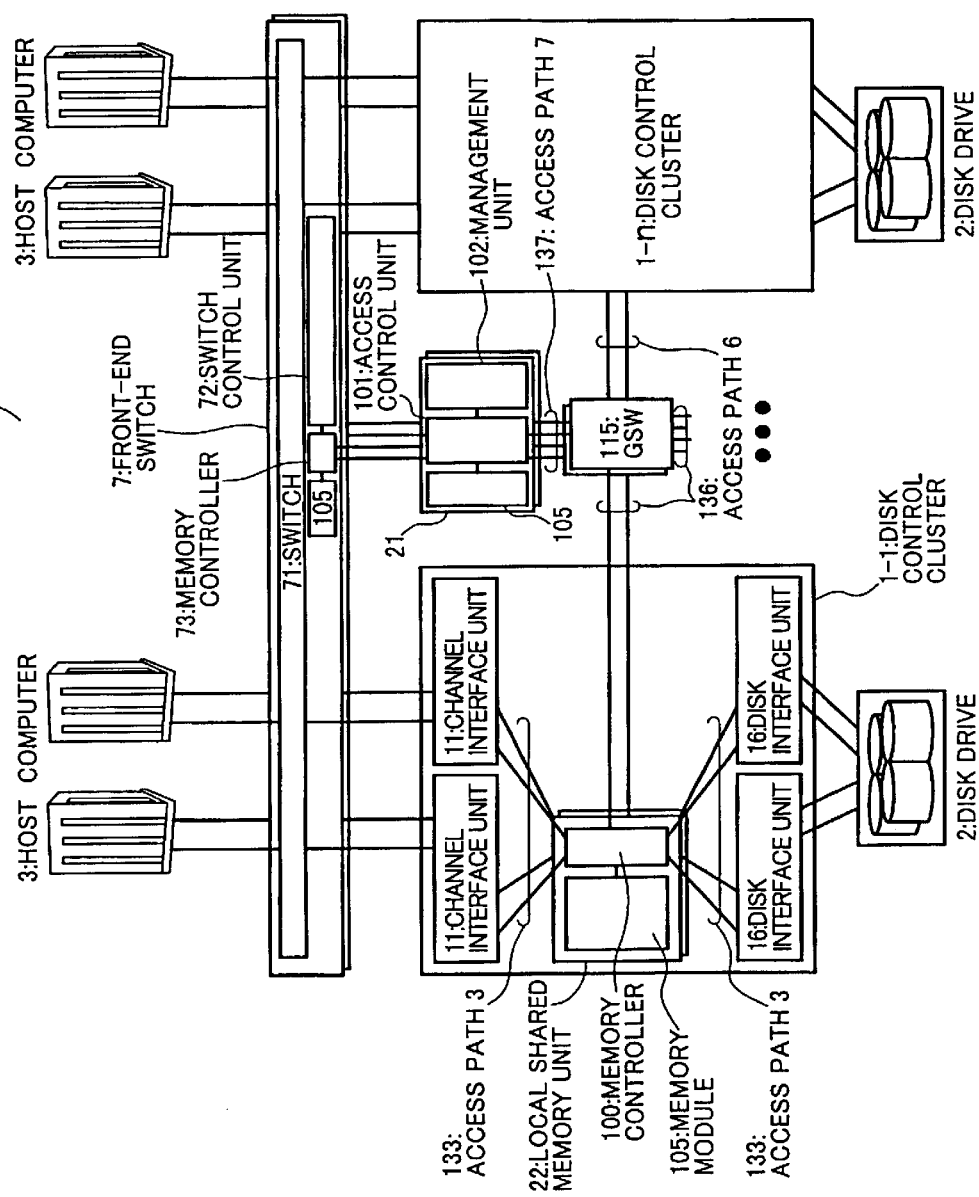
FIG. 5 shows a detailed arrangement of the storage system of the embodiment 2 of FIG. 4.

A specific example of the storage system 1 is shown in FIG. 5.

The structure of each of the disk control clusters 1-1 to 1-n is also the same as that in the embodiment 1 shown in FIG. 3, except for a connection configuration between the channel IF units 11, disk IF units 16 and local shared memory units 22 and for a connection configuration between the disk control clusters 1-1 to 1-n and global switches (GSWs) 115.

A storage system 1 includes a plurality of disk control clusters 1-1 to 1-n, front-end switches 7, global information control units 21, two global switches (GSWs) 115, access paths 136, and access paths 137.

Each of the disk control clusters 1-1 to 1-n has two channel IF units 11 as interfaces with the host computers 3, two disk IF units 16 as interfaces with the associated disk drive 2, two local shared memory units 22, access paths 133 and access paths 136.

The two access paths 133 are connected to the memory access controller 206 in each channel IF unit 11 to connect the memory access controller to the two different memory controllers 100.

Therefore connected to the memory controller 100 are a total of four access paths 133 of two from the two channel IF units 11 and two of the two disk IF units 16. Also connected to the memory controller 100 is one access paths 136 leading to the global switch (GSW) 115.

Since the memory controller 100 has such access paths connected thereto as mentioned above, the memory controller 100 has a function of routing requests from the four access paths 133 issued from the channel IF units 11 and disk IF units 16 to one access path leading to the memory module 105 and to one access path 136 lading to the global switch (GSW) 115.

Even when the access paths 136 are connected directly to the access control units 101 without using the global switches (GSWs) 115, this will involve no problem from the viewpoint of embodying the present invention. As a result, the overhead of the data transfer processing generated by the global switches (GSWs) 115 can be reduced and thus a performance can be improved.

When the global switches (GSWs) 115 are not used, for the purpose of securing an access route from one memory controller 100 to one access control unit 101 to enhance a fault tolerance, two of the access paths 136 are connected to the memory controller 100 to connect it to different access control units 101.

As in the embodiment 1, in FIG. 5, the global switches (GSWs) 115 and global information control unit 21 may be mounted in a box, the front-end switch 7 may be mounted in another box, and these boxes may be mounted in a single rack together with the disk control clusters 1-1 to 1-n in the form of modules. Further, the disk control clusters 1-1 to 1-n may be mounted in individual racks and located as distributed at locations distantly away from each other.

In the present embodiment, the operations of the respective units within the storage system 1 when data read/write operations are carried out from the host computer 3 to the storage system 1 are the same as those in the embodiment 1, except that access from the channel IF unit 11 and disk IF unit 16 to the local shared memory unit 22 is carried out directly and that access from the channel IF unit 11 and disk IF unit 16 to the global information control unit 21 is carried out through the memory controller 100.

In the present embodiment, even when the host computer 3 is connected to any of the connection ports of the front-end switch 7, the host computer can write and read data only by issuing an access route to that connection port while the disk control clusters of the storage system 1 are made transparent to the host computer, thereby causing the host computer to look the plurality of disk control clusters 1-1 to 1-n like a single storage system.

And there can be provided a storage system which ranges from a small scale configuration including a single disk control cluster to a huge scale configuration including tens of connected disk control clusters, which copes with an architecture having high reliability and performance possessed by the single disk control cluster, and which has a good scalability and handleability.

Embodiment 3

FIGS. 6, 7, 12 and 13 show an embodiment of the present invention.

Figure 6:
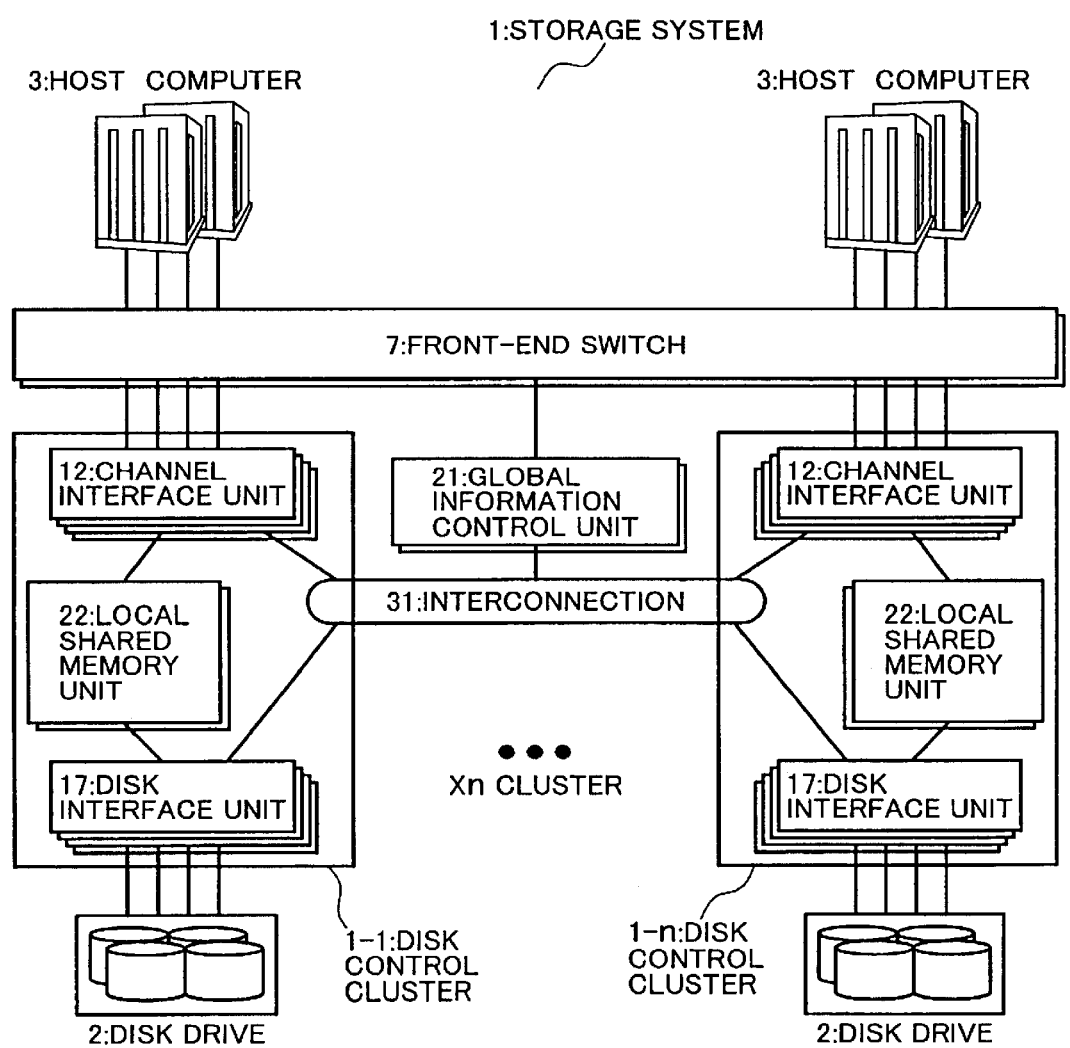
FIG. 6 shows an arrangement of a storage system in accordance with an embodiment 3 of the present invention.

As shown in FIG. 6, the configuration of a storage system 1 including disk control clusters 1-1 to 1-n and a front-end switch 7 is the same as that of the embodiment 1 of FIG. 1, except for a connection configuration between channel IF units 12, disk IF units 17 and local shared memory units 22.

In each of the disk control clusters, the channel IF unit 12, disk IF unit 17 and local shared memory unit 22 are directly connected with each other.

Further, the channel IF units 12 and disk IF units 17 of the plurality of disk control clusters 1-1 to 1-n are connected by an interconnection 31 to which the global information control units 21 are connected.

As mentioned above, in the present embodiment, the channel IF units 12, disk IF units 17 and local shared memory units 22 are directly connected to each other in each of the disk control units 1-1 to 1-n. As a result, when compared with the case of the embodiment 1 wherein these units are interconnected by the interconnection 31, an access time to the local shared memory unit 22 can be shortened.

The structures of the channel IF unit 12 and disk IF unit 17 correspond to those of the channel IF unit 11 and disk IF unit 16 shown in FIGS. 12 and 13 respectively, but the number of access paths for the memory access controller 206 are increased to 4.

In this case, two of the four access paths are denoted by 131 and the other two are denoted by 133.

Each of the disk control clusters may be arranged as a single rack or module, but itself must have a function as a single disk controller.

Figure 7:
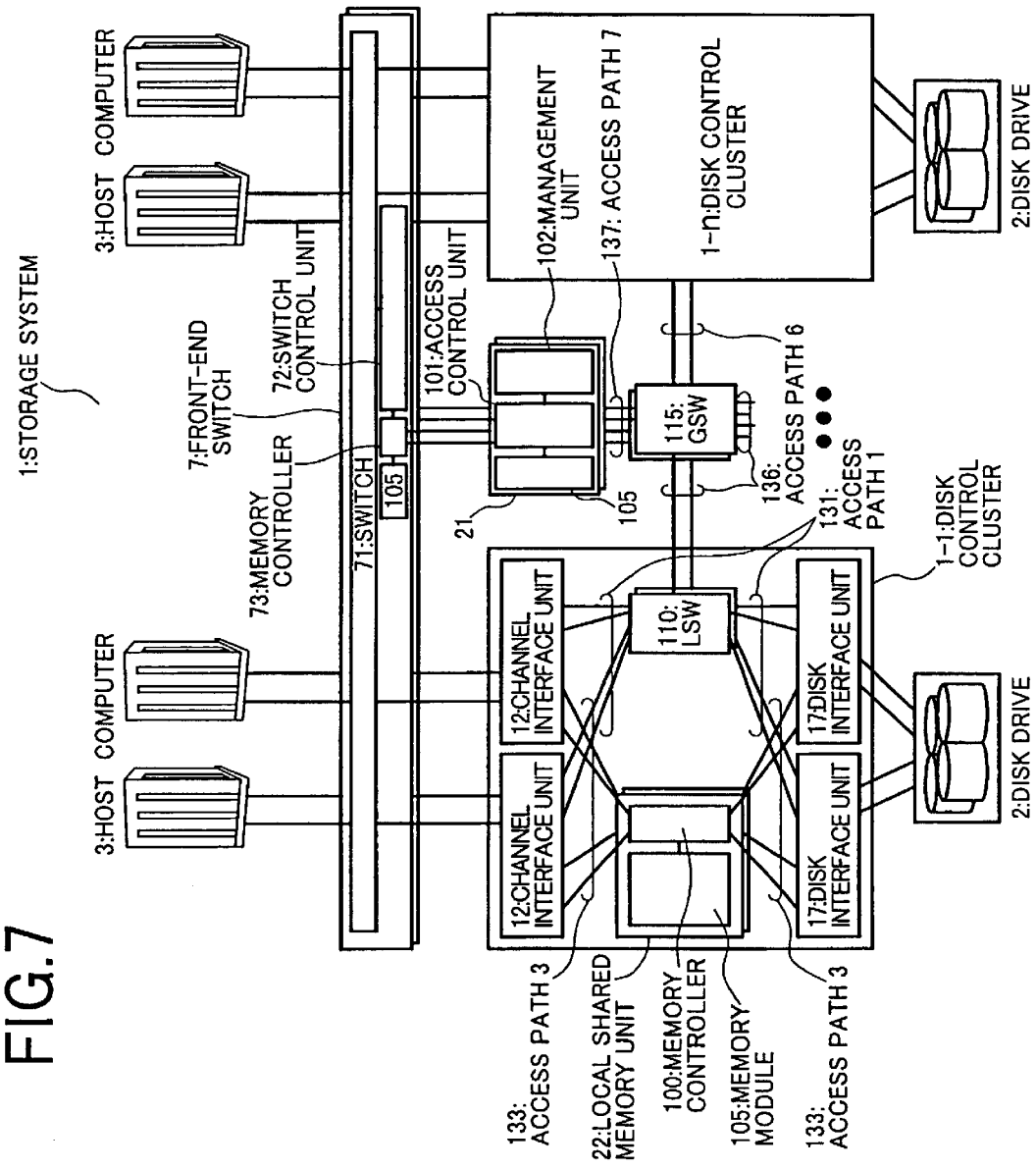
FIG. 7 shows a detailed arrangement of the storage system of the embodiment 3 of FIG. 6.

A specific example of the storage system 1 is shown in FIG. 7.

The structure of each of the disk control clusters 1-1 to 1-n is also the same as that in the embodiment 1 of FIG. 3, except for a connection configuration between the channel IF units 12, disk IF units 17 and local shared memory units 22.

The storage system 1 includes a plurality of disk control clusters 1-1 to 1-n, front-end switches 7, global information control units 21, two global switches (GSWs) 115, access paths 136, and access paths 137.

Each of the disk control clusters 1-1 to 1-n has two channel IF units 12 as interfaces with the host computers 3, two disk IF units 17 as interfaces with the associated disk drives 2, two local switches (LSWs) 110, two local shared memory units 22, access paths 131, access paths 133, and access paths 136.

The LSW 110 is a connection unit which connects paths from the channel IF units 12 and paths from the disk IF units 17.

The access paths 133, two of which are connected to each of memory access controllers 206 of the channel IF units 12 and disk IF units 17, are connected to two different memory controllers 100. Accordingly a total of four access paths 133 of two from the two channel IF units 12 and two from the two disk IF units 17 are connected to the memory controller 100.

Further, the access paths 131, two of which are connected to each of the memory access controllers 206 within the channel IF units 12 and disk IF units 17, are connected at their other ends to the two different LSWs 110. Accordingly a total of four access paths 131 of two from the two channel IF units 12 and two from the disk IF units 17, are connected to the LSW 110. The LSW 110 also has one access path 136 connected to the global switch (GSW) 115.

As in the embodiment 1, even when the global switches (GSWs) 115 are not used and the access paths 136 are directly connected to the access control units 101, this will not involve any trouble from the viewpoint of embodying the present invention. With it, the overhead for the data transfer processing generated by the global switches (GSWs) 115 can be reduced and thus a performance can be improved.

When the global switches (GSWs) 115 are not used, for the purpose of securing two access routes from one LSW 110 to one access control unit 101 to improve its fault tolerance, the LSWs 110 have two of the access paths 136 to be connected to the different access control units 101.

As in the embodiment 1, in FIG. 7, the global switches (GSWs) 115 and global information control units 21 may be mounted in a box, the front-end switches 7 are mounted in another box, and these boxes may be mounted in a single rack together with the disk control clusters 1-1 to 1-n. Or the disk control clusters 1-1 to 1-n may be mounted in individual racks as distributed at locations distantly away from each other.

In the present embodiment, the operations of the respective units in the storage system 1 when data read/write operation is carried out from the host computer 3 to the storage system 1 are substantially the same as those in the embodiment 1, except that access from the channel IF units 12 and disk IF units 17 to the local shared memory unit 22 is carried out directly.

In the present embodiment, even when the host computer 3 is connected to any of the connection ports of the front-end switch 7, the host computer 3 can perform write and read operation only by issuing an access request to that connection port while eliminating the need for paying consideration to the disk control clusters of the storage system 1, thus causing the host computer 3 to look the plurality of disk control clusters 1-1 to 1-n like a single storage system.

And there can be provided a storage system which ranges from a small scale configuration including a single disk control cluster to a huge scale configuration including tens of connected disk control clusters, which copes with an architecture having high reliability and performance possessed by the single disk control cluster, and which has a good scalability and handleability.

Embodiment 4

An embodiment of the present invention is shown in FIGS. 8, 9, 12 and 13.

Figure 8:
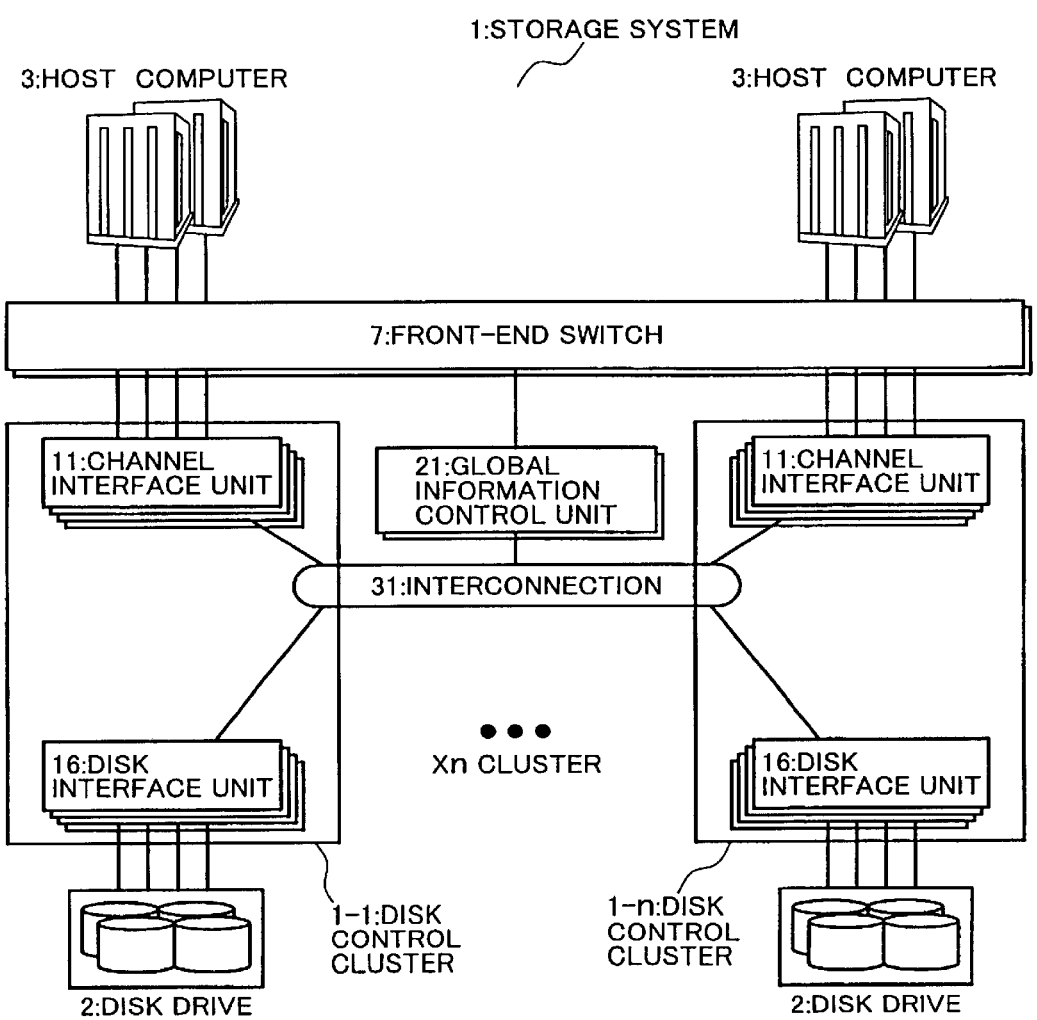
FIG. 8 shows an arrangement of a storage system in accordance with an embodiment 4 of the present invention.

As shown in FIG. 8, the configuration of a storage system 1 including disk control clusters 1-1 to 1-n and front-end switches 7 is substantially the same as that of the embodiment 1, except that the local shared memory units 22 are removed in the embodiment 1.

To this end, all information to be stored in the local shared memory unit 22 of each of the disk control clusters 1-1 to 1-n in the embodiment 1 are stored in the global information control unit 21.

The channel IF units 11 and disk IF unit 16 in the disk control clusters 1-1 to 1-n are connected by an interconnection 31 to which the global information control units 21 are connected.

The structures of the channel IF unit 11 and disk IF unit 16 are the same as those of the corresponding units in the embodiment 1 shown in FIGS. 12 and 13 respectively.

One disk control cluster may be arranged as a single rack or module.

Figure 9:
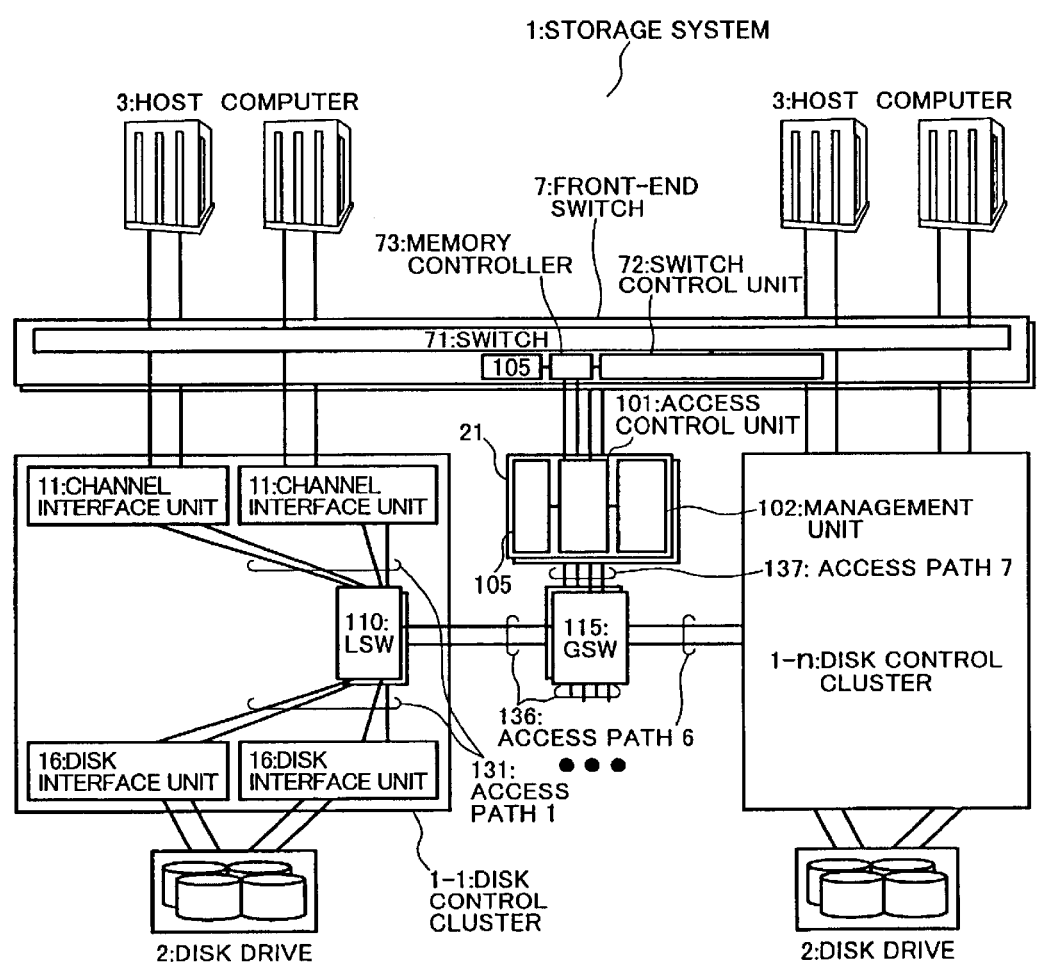
FIG. 9 shows a detailed arrangement of the storage system of the embodiment 4 of FIG. 8.

A specific example of the storage system 1 is shown in FIG. 9.

The structure of each of the disk control clusters 1-1 to 1-n is also the same as that of the corresponding one in the embodiment 1 of FIG. 3, except that the local shared memory units 22 are absent.

The storage system 1 includes a plurality of disk control clusters 1-1 to 1-n, front-end switches 7, global information control units 21, two global switches (GSWs) 115, access paths 136, and access paths 137.

Each of the disk control clusters 1-1 to 1-n has two channel IF units 11 as interfaces with the host computers 3, two disk IF units 16 as interfaces with the associated disk drives 2, two local switch (LSWs) 110, access paths 131, and access paths 136.

The LSW 110 is a connection unit which connects paths from the channel IF units 11 and paths from the disk IF units 16.

Each of the memory access controllers 206 in the channel IF unit 11 and disk IF unit 16 has two access paths 131 connected on the other ends with two different LSWs 110.

Accordingly connected to the LSW 110 are a total of four access paths 136 of two from the two channel IF units 11 and two from the two disk IF units 16. Also the LSW 110 has one access paths 136 connected to the global switches (GSWs) 115.

As in the storage system 1, even when the global switches (GSWs) 115 are not used and the access paths 136 are connected directly to the access control units 101, this will not involve any problem from the viewpoint of embodying the present invention. As a result, the overhead for the data transfer processing generated by the global switches (GSWs) 115 can be reduced and thus its performance can be improved.

In the case where the global switches (GSWs) 115 are not used, for the purpose of securing two access routes from one LSW 110 to one access control unit 101 to improve a fault tolerance, the LSWs 110 have two of the access paths 136 to be connected to the different access control units 101.

As in the embodiment 1, in FIG. 9, the global switches (GSWs) 115 and global information control units 21 may be mounted in a box, the front-end switches 7 are mounted in another box, and these boxes may be mounted in a single rack together with the disk control clusters 1-1 to 1-n in the form of a module. Further, the disk control clusters 1-1 to 1-n may be mounted in individual racks and located as distributed at locations distantly away from each other.

In the present embodiment, the operations of the respective units in the storage system 1 when data read/write operation from the host computer 3 to the storage system 1 is carried out, are substantially the same as those of the corresponding ones in the embodiment 1, except that all the processings of the local shared memory units 22 in the embodiment 1 are carried out by the global information control unit 21.

In the present embodiment, even when the host computer 3 is connected to any of the connection ports of the front-end switch 7, the host computer can perform data write and read operation only by issuing an access request to that connection port, while eliminating the need for paying consideration to the disk control clusters of the storage system 1, thus causing the host computer 3 to look the plurality of disk control cluster 1-1 to 1-n like a single storage system.

And there can be provided a storage system which ranges from a small scale configuration including a single disk control cluster to a huge scale configuration including tens of connected disk control clusters, which copes with an architecture having high reliability and performance possessed by the single disk control cluster, and which has a good scalability and handleability.

Embodiment 5

Figure 10:
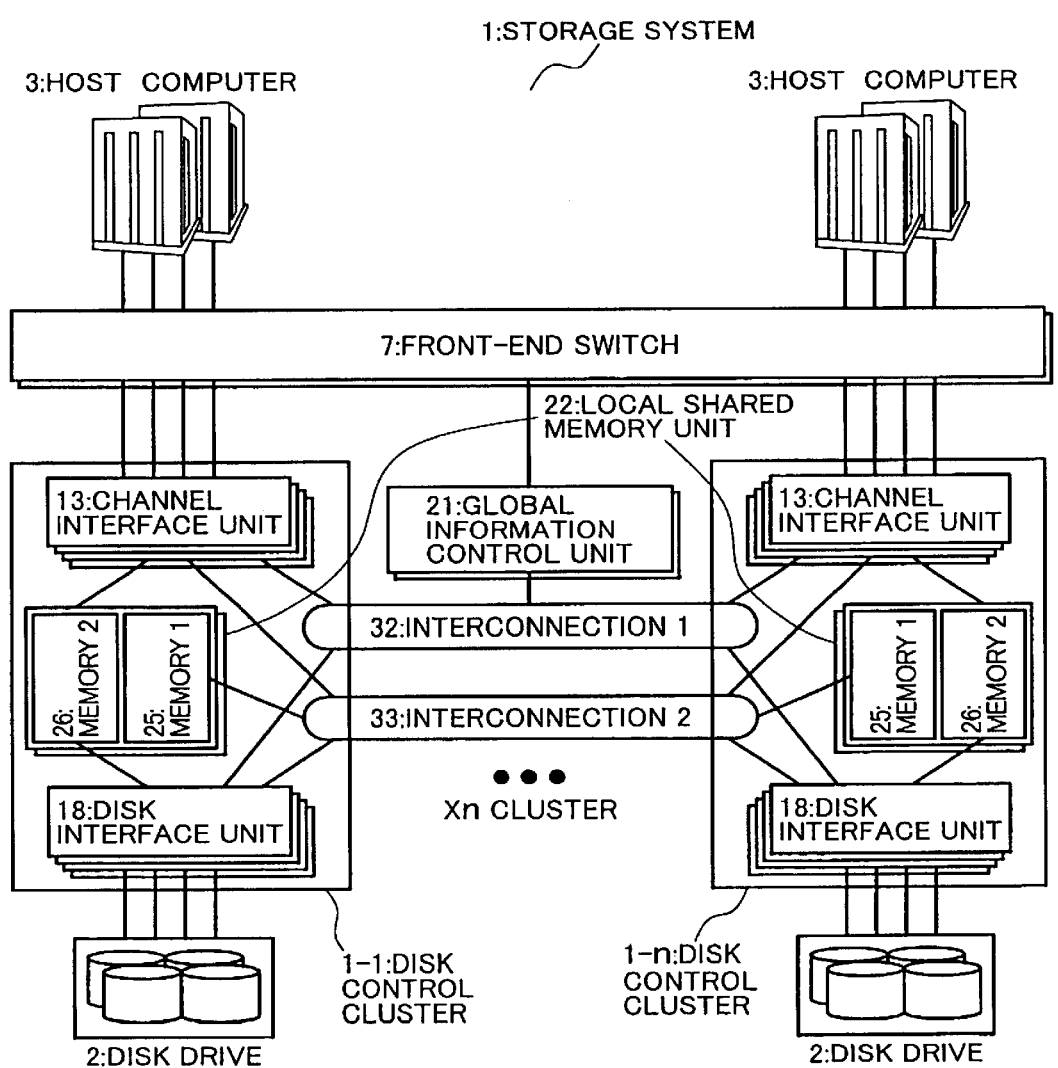
FIG. 10 shows an arrangement of a storage system in accordance with an embodiment 5 of the present invention.

An embodiment of the present invention is shown in FIG. 10.

Explanation will be made in connection with an example wherein the interconnection is made in the form of a switch in the foregoing embodiment, but the interconnection may be made in any form such as a bus, so long as it can be interconnected to transfer control information or data.

As shown in FIG. 10, a storage system 1 includes a plurality of disk control clusters 1-1 to 1-n and front-end switches 7.

Each of the disk control clusters 1-1 to 1-n has interface units (channel IF units) 13 as interfaces with the host computers 3, interface units (disk IF units) 18 as interfaces with an associated disk drive 2, and local shared memory units 22 each having a memory 1 (memory 25') and a memory 2 (memory 26'). In each of the disk control clusters, the channel IF units 13, disk IF units 18 and memories 2 are directly connected to each other.

The channel IF units 13 and disk IF units 18 are also connected by an interconnection 1 (interconnection 32) wired across the plurality of disk control clusters 1-1 to 1-n, and the global information control units 21 are connected to the interconnection 32. In other words, all the channel IF units 13 and disk IF units 18 are arranged to be able to access the global information control units 21 via the interconnection 32.

The channel IF units 13, disk IF units 18 and memory 1 are also connected therebetween by an interconnection 33 (interconnection 2) wired across the plurality of disk control clusters 1-1 to 1-n.

The host computers 3 are connected to the disk control clusters via the front-end switches 7 so that any of the computers can access any of the disk control clusters.

Figure 14:
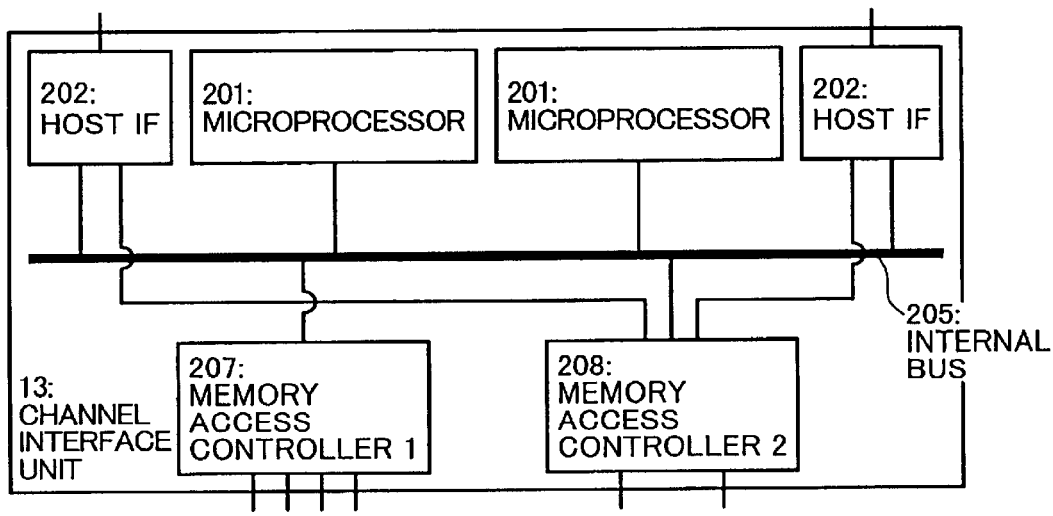
FIG. 14 shows another structure of the channel interface unit forming the storage system of the present invention.

A specific example of one of the channel IF units 13 is shown in FIG. 14.

Each of the channel IF units 13 has two IFs (host IFs) 202 as interfaces with the host computer 3, two microprocessors 201 for controlling input and output to and from the host computer 3, an access control unit 1 (memory access controller 1) 207 for controlling an access to the global information control unit 21 or memories 26' (memories 2), and an access control unit 2 (memory access controller 2) 208 for controlling an access to the memory 25' (memory 1). The channel IF units 13 execute data transfer between the host computers 3 and memories 1 and transfer of control information between the microprocessors 201 and global information control units 21 or memories 2.

The microprocessors 201 and host IFs 202 are interconnected by an internal bus 205, the memory access controller (controller 1) 207 is connected to the internal bus 205, and the memory access controller (controller 2) 208 are connected directly to the two host IFs 202 and also to the internal bus 205.

Figure 15:
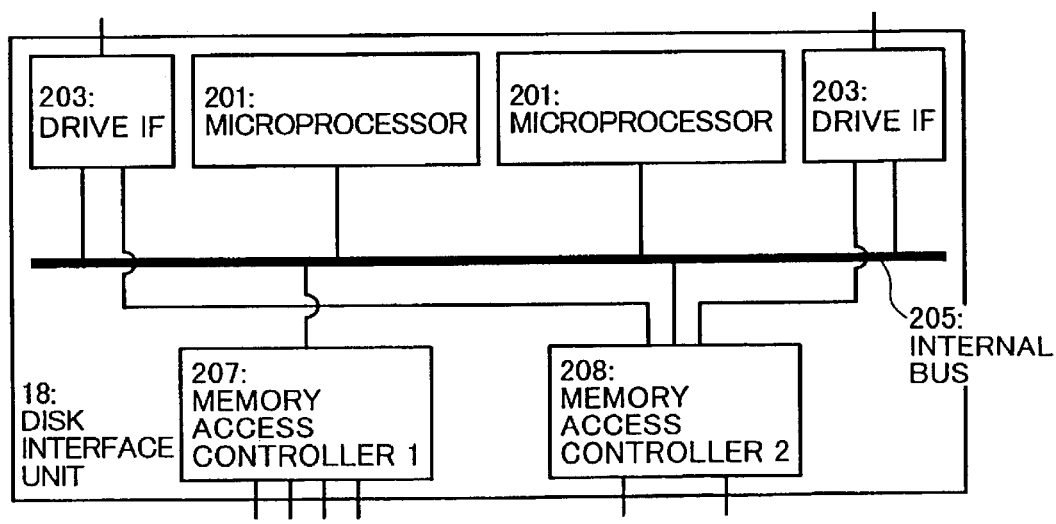
FIG. 15 shows another structure of the disk interface unit forming the storage system of the present invention.
Figure 23:
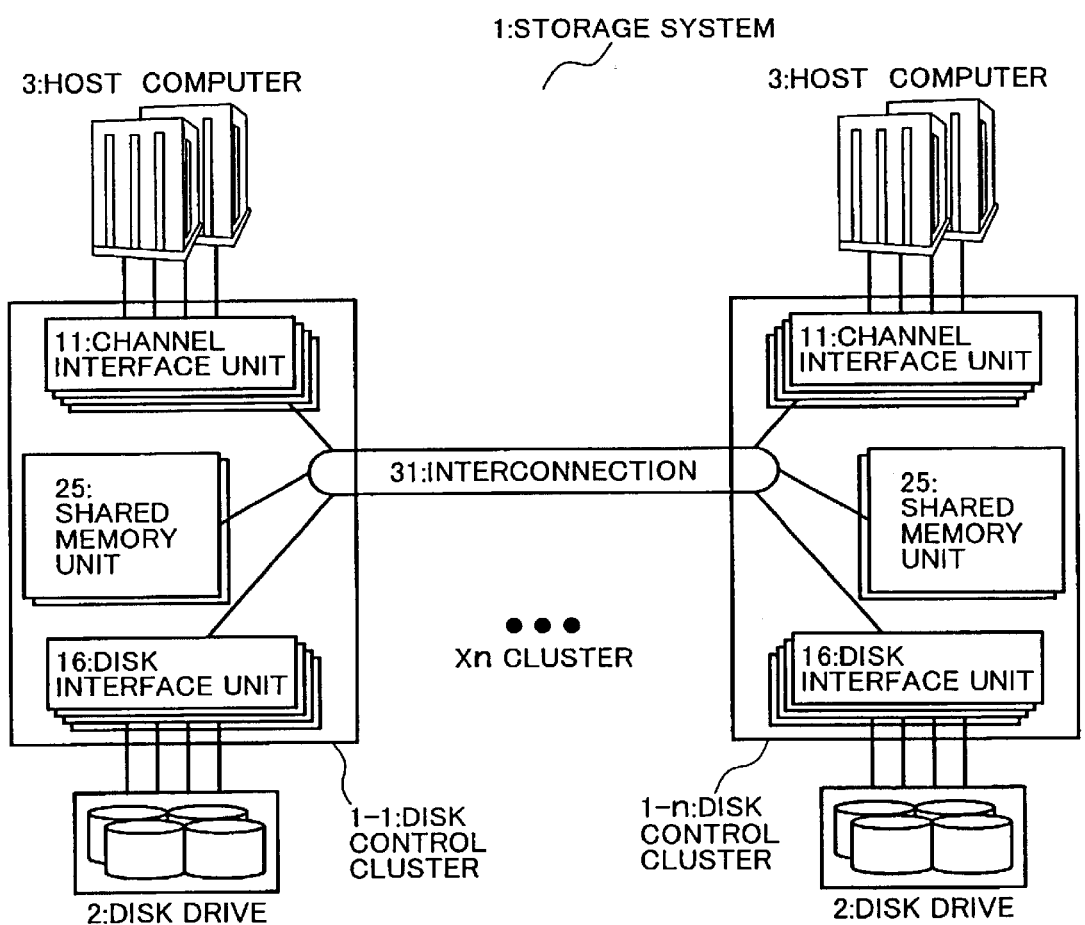
FIG. 23 shows an arrangement of a storage system including a plurality of disk control clusters in a prior art.

A specific example of one of the disk IF units 18 is shown in FIG. 15.

The disk IF unit 18 has two drive IFs 203 as interfaces with the associated disk drive 2, two microprocessors 201 for controlling input and output to and from the disk drive 2, an access control unit 1 (memory access controller 1) 207 for controlling an access to the global information control unit 21 or memories 26' (memories 2), and an access control unit 2 (memory access controller 2) 208 for controlling an access to the memory 25' (memory 1). The disk IF unit 18 executes data transfer between the disk drive 2 and memory 1 and transfer of control information between the microprocessors 201 and global information control unit 21 or memory 2.

The microprocessors 201 and drive IFs 203 are connected by an internal bus 205, the memory access controller (controller 1) 207 is connected to the internal bus 205, and the memory access controller (controller 2) 208 is connected directly to the two drive IFs 203 or to the internal bus 205. The disk IF units 18 also executes a RAID function.

One disk control cluster may be made in the form of a single rack or module, but itself must have a function as one disk controller.

In the specific example of the storage system, connection configurations between the channel IF units 13 and disk IF units 18 and the memories 26 (memories 2), interconnection 32 (interconnection 1), and global information control units 21 are substantially the same as those of the corresponding ones in the embodiment 3 of FIG. 7. Further, connection configurations between the channel IF units 13 and disk IF units 18 and the memories 1 and interconnection 33 (interconnection 2) are substantially the same as those of the corresponding ones in the embodiment 1 of FIG. 3, but the global information control units 21 are removed in the embodiment 1.

The front-end switch 7 has a switch 71, a switch control unit 72, a memory controller 73 and a memory module 105.

One host computer 3 has two paths connected to the switches 71 in the two front-end switches 7, and switches 71 have 'n' paths connected to the disk control clusters 1-1 to 1-n.

The global information control unit 21 has an access control unit 101, a management unit 102 and a memory module 105. And the global information control unit 21 stores management information (e.g., storage area information managed by the respective disk control clusters, or load, error and configuration information about respective parts in the disk control clusters) of the disk control clusters 1-1 to 1-n therein. The memory 1 temporarily stores therein data to be recorded in the disk drive 2. The memory 2 also stores therein control information (e.g., information on data transfer control between the channel IF units 13 and disk IF units 18 and the memories 25' (memories 1) and management information about data to be recorded in the disk drive 2) about the disk control clusters.

The front-end switch 7, which stores information similar to in the embodiment 1 in the memory module 105 provided therein, performs a similar control to in the embodiment 1.

The global information control unit 21 also stores information and table similar to those in the embodiment 1 in the memory module 105 provided therein.

In FIG. 10, switches forming an interconnection 32 (interconnection 1) outside of the disk control clusters, switches forming an interconnection 33 (interconnection 2) outside of the disk control clusters, and the global information control units 21 may be mounted in a box, the front-end switches 7 may be mounted in another box, and these boxes may be mounted in a single rack together with the disk control clusters 1-1 to 1-n in the form of modules. Further the disk control clusters 1-1 to 1-n may be located as distributed at locations distantly away from each other.

In FIG. 10, explanation will be explained in connection with an example wherein the host computer 3 reads out data recorded in the storage system 1.

First of all, the host computer 3 issues a data read request to the storage system 1.

The request is accepted by the front-end switch 7 so that the switch control unit 72 within the front-end switch 7 analyzes the header of the request packet.

Stored in the header of the request packet are the number (host computer number) of the host computer which issued the request and a logical volume number for the recorded request data. The switch control unit 72 refers to the host/logical volume correspondence table 600, connects the port of the switch 71 connected with the host computer as the request issuer to the port of the switch 71 having a channel number assigned to the corresponding logical volume number, and sends the request packet to the disk control clusters.

The microprocessor 201 within the channel IF unit 13 connected with the request send channel accesses a memory 26 (memory 2) in its own disk control cluster 1-1, and examines one of the disk drives 2 in which the request data is stored. Since a conversion table showing the address of the request data and an address in the disk drive 2 at which the data is actually recorded is stored in the memory 26 (memory 2), the microprocessor 201 can examine one of the disk drives 2 in which the request data is stored. Further, microprocessor 201 in the channel IF units 13 when receiving the request accesses the memory 26 (memory 2) in the own disk control cluster 1-1, and confirms whether or not the request data is stored in the memory 25 (memory 1). The directory information on the data stored in the memory 25 (memory 1) is stored in the memory 26 (memory 2) and thus the presence or absence of the request data in the memory 25 (memory 1) can be confirmed.

As a result of the confirmation, if the data is present in the memory 25 (memory 1) in the own disk control cluster 1-1, then the data is transferred to the channel IF unit 13 and then sent to the host computer 3 via the front-end switch 7.

If the data is not present in the memory 25 (memory 1) in the own disk control cluster 1-1, then the microprocessor 201 within the channel IF unit 13 reads out the request data from the microprocessor 201 within the disk IF unit 18 connected with the disk drive 2 having the request data stored therein, issues control information indicative of the processing contents of the data request demanding storage of it in the memory 25 (memory 1) to the microprocessor 201 within the disk IF unit 18. The microprocessor 201 of the disk IF unit 18 when receiving the control information reads out the data from the disk drive 2 having the request data stored therein, transfers the request data to the memory 25 (memory 1) within the own disk control cluster 1-1, and stores therein.

That is, the microprocessor 201 of the channel IF unit 13 issues the control information indicative of the processing contents of the data request and stores it in a control information area (job control block) of the memory 26 (memory 2).

The microprocessor 201 of the disk IF unit 18 watches the control information area of the memory 26 (memory 2) by polling. When the issued control information is present in the control information area (job control block), the microprocessor reads out the data from the disk drive 2 having the request data stored therein, transfers the request data to the memory 25 (memory 1), and stores it therein.

The microprocessor 201 within the disk IF unit 18, after storing the request data in the memory 25 (memory 1), transmits the address of the data stored in the memory 25 (memory 1) to the microprocessor 201 within the channel IF unit 13 as the control information issuer in the form of control information within the memory 26 (memory 2). The microprocessor 201 within the channel IF unit 13 after receiving the address read out the data from the memory 25 (memory 1) and sends it to the host computer 3 via the front-end switch 7.

That is, the microprocessor 201 of the disk IF unit 18, after storing the request data in the memory 25 (memory 1), issues control information indicative of the end of the processing execution and the data storage address, and stores it in the control information area of the local shared memory unit 22.

The microprocessor 201 of the channel IF unit 13 after issuing the control information watches the control information area of the memory 26 (memory 2) by polling. When the control information issued from the microprocessor 201 of the disk IF unit 18 is present in the control information area, the microprocessor reads out the data from the memory 25 (memory 1) on the basis of the address at which the data is stored in the memory 25 (memory 1), transfers the data to the channel IF unit 13, and further sends it to the host computer 3 via the front-end switch 7.

Since the control information is different in data length from the data by thousands of times, a time necessary for one-time transfer of the control information is remarkably different from a time necessary for one-time transfer of the data. For this reason, when the same interconnection and memory are employed, the both will block the transfer of the control information and data. According to the present embodiment, the interconnection 32 (interconnection 1) for transfer of the control information and the interconnection 33 (interconnection 2) for transfer of the data can be dividedly provided. As a result, it can be avoided that the transfer of the control information be blocked by the transfer of the data, thus improving a performance.

Embodiment 6

Figure 11:
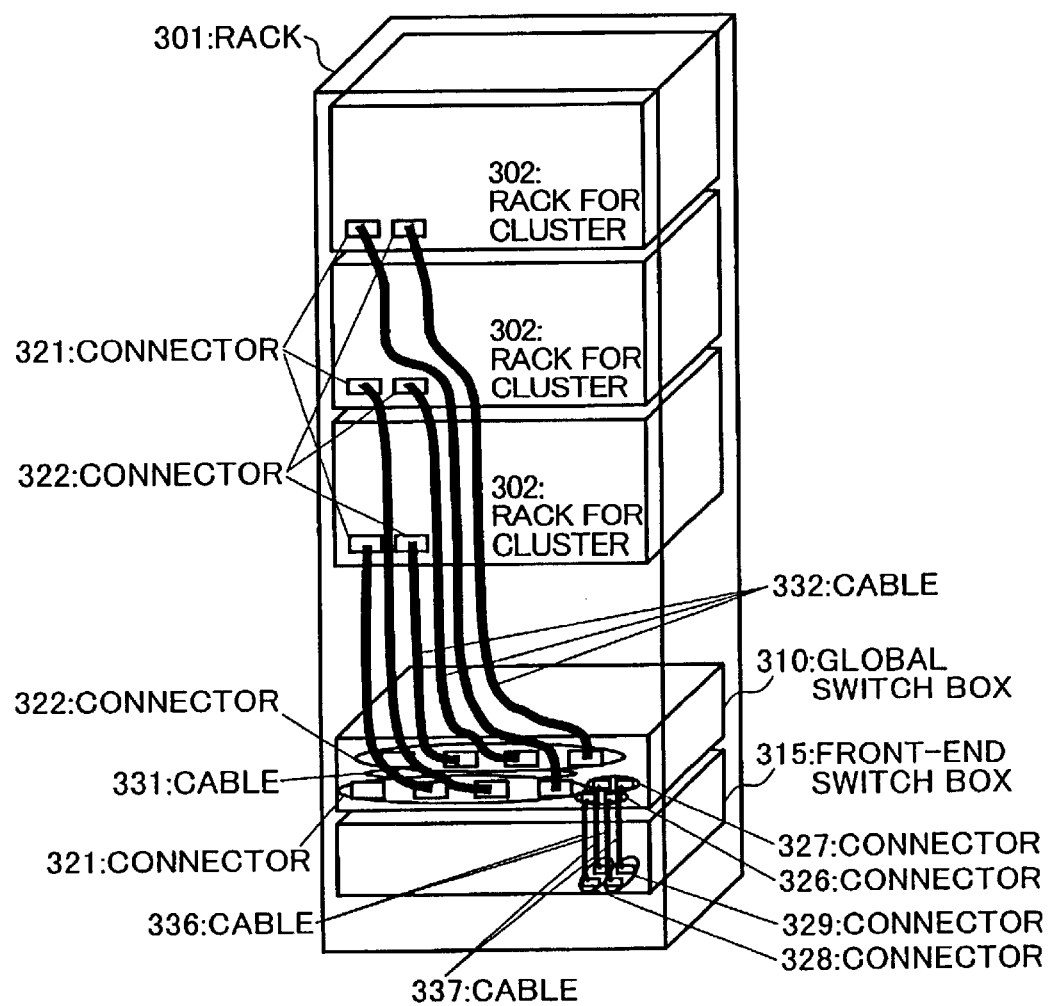
FIG. 11 is a diagram for explaining a method of increasing the number of disk control clusters in the present invention.

FIGS. 11, 16 and 17 show an example of a procedure of increasing the number of disk control clusters in the storage system 1 of the embodiment 1.

As shown in FIG. 11, a global switch box 310, a front-end switch box 315 and individual cluster racks 302 are mounted in a rack 301.

Incorporated in the global switch box 310 are global switches (GSWs) 115 and global information control units 21.

The global switch box 310 has eight connectors 321 and eight connectors 322, through which eight disk control clusters can be connected. The drawing shows a case where three disk control clusters are connected to the global switch box 310.

The access paths 136 of the GSWs 115 are connected to the connectors 321 and 322 in one-by-one relationship.

The global switch box 310 has two connectors 326 and two connectors 327, through which the box 310 are connected with the front-end switch box 315.

Two connection paths for connection of one access control unit 101 of the global information control unit 21 to two memory controllers 73 of the front-end switches 7 are connected to the two connectors 326. Two connection paths for connection of the other access control unit 101 to the two memory controllers 73 of the front-end switch 7 are connected to the two connectors 327.

Incorporated in the front-end switch box 315 is the front-end switches 7.

The front-end switch box 315 has two connectors 328 and two connectors 329, through which the box 315 is connected to the global switch box 310.

Two connection paths for connection of one of the memory controllers 73 of the front-end switches 7 to the two access control units 101 of the global information control units 21 are connected to the two connectors 328. Further, two connection paths for connection of the other memory controller 73 to the two access control units 101 of the global information control units 21 are connected to the two connectors 329.

The aforementioned number has been given only as an example and is not limited to the above example.

The disk control clusters 1-1 to 1-3 are mounted in the respective cluster racks 302. Each of the cluster racks 302 has a connector 321 and a connector 322, to which the two access paths 136 are connected in a one-by-one relationship.

The connectors 321 and connectors 322 of the cluster racks 302 are connected to the global switch box 310 via cables 331 and cables 332.

Further, the connectors 328 and connectors 329 of the front-end switch box 315 are connected to the connectors 326 and connectors 327 of the global switch box 310 via cables 336 and cables 337.

Now the two cables 336 connected to the two connectors 326 are connected to the connector 328 and the connector 329 in a one-by-one relationship therebetween. Similarly two cables 337 connected to the connectors 327 are connected to the connector 328 and 329 in a one-by-one relationship therebetween. In this manner, the two connection paths of the access control units 101 are connected to the two memory controllers 73 in a one-by-one relationship therebetween.

In the storage system 1, the number of disk control clusters is increased in a procedure which follows. When the global switch box 310 has remaining idle connectors for the increased disk control clusters, the cables 331 and 332 are connected to the idle connectors.

When such idle connectors are absent, a global switch box having only the GSW mounted therein is prepared, a plurality of such global switch boxes are connected in multiple stages, and the cables 331 and 332 are connected to connectors of the boxes.

Simultaneously with the above, a GSW port/cluster correspondence table 400 indicating the disk control clusters to be connected to the ports of the GSWs 115, that is, showing the disk control clusters forming the storage system 1 as shown in FIG. 16 as well as a cluster/logical volume correspondence table 405 showing logical volumes to be managed by the disk control clusters as shown in FIG. 17 are rewritten.

The GSW port/cluster correspondence tables 400 and the cluster/logical volume corresponding table 405 are stored in the global information control unit 21 to be rewritten by a service processor (SVP).

In many cases, a notebook type personal computer is usually used as the SVP, so that such tables as shown in FIGS. 16 and 17 are displayed on a display screen of the notebook computer and the contents thereof are rewritten thereon.

Shown in FIGS. 16 and 17 are GSW port/cluster correspondence tables 400 and the cluster/logical volume corresponding table 405 before and after an increase of a disk control cluster.

In this case, the drawings show an example where five disk control clusters are already provided in the storage system 1 before the increase of the disk control cluster and one disk control cluster is added.

As shown in FIG. 16, the port number 4 is 'not connected' in the GSW port number 401. After the cable of cluster 5 is connected to that port, the 'not connected' corresponding to the port number 4 in a row of cluster number 402 is rewritten to '5' on the display.

Thereafter, as shown in FIG. 17, 'not connected' in a column of logical volume number 406 corresponding to the cluster number 5 of the cluster number 402 is rewritten to '16640 to 20735'.

In this case, the logical volume number 406 shows a range of logical volumes to be managed by the respective clusters.

A maximum value of the logical volume before the increase is 16639 and the disk control cluster has 4096 logical volumes. Thus the range of the logical volumes to be managed by the disk control cluster 5 is '16640 to 20735'. The logical volumes can be numbered not consecutively and as skipped, without any problem.

When the tables are arranged in such a manner as mentioned above, a disk control cluster can be newly added.
Embodiment 7

FIGS. 18 to 21 show examples of operations of the global control information part and front-end switch 7 when the load of one of interfaces (channels) of one channel interface unit with the host computer became high in a storage system 1.

As shown in the embodiment 1, as an example, the global information control unit 21 stores such a system configuration/operation status table 500 as shown in FIG. 18 in its memory module 105, and the front-end switch 7 previously stores a copy of the table 500 to the memory module 105.

The management unit 102 within the global information control unit 21 periodically refers to information about storage areas stored in the local shared memory units 22 of the disk control clusters and managed by the disk control clusters, load and error information on respective parts within the disk control clusters; and updates the system configuration/operation status table 500.

Further, the switch control unit 72 within the front-end switch 7 copies the table 500 to its own memory module 105.

Meanwhile, at the time point that the information of the storage areas stored in the local shared memory unit 22 of each disk control cluster and managed by the disk control cluster, or the load or error information of the parts in the disk control cluster was updated; the microprocessor within the channel IF unit or disk IF unit may update the corresponding information of the memory module 105 of the global information control unit, and further at the update time point, the management unit 102 may copy the corresponding information to the memory module 105 of the front-end switch 7. This is effective, in particular, when an error took place one part within the disk control unit.

The system configuration/operation status table 500 contains a cluster number 511 for identification of the disk control clusters, a logical volume number 513 associated with a channel number 512 for identification of the channels of the disk control clusters and a channel operation status 514 associated with the channel number 512.

In the present embodiment, the cluster number 511, channel number 512 and logical volume number 513 are expressed each in hexadecimal notation. The channel operation status 514 denotes its low load condition by '0', a medium load condition by '1', a high load condition by '2' and an error by '3'.

The front-end switch 7 stores the host/logical volume correspondence table 600 in its memory module 105 as it is.

The host/logical volume correspondence table 600 contains a logical volume number 513 corresponding to the host computer number 615 for identification of the host computers, that is, a logical volume assigned to each host computer, a channel number 512 for access to the logical volume number 513, and a cluster number 511 of the disk control cluster for management of the corresponding logical volume.

As the host computer number 615, it is considered to use, for example, a worldwide name (WWN) used in a fiber channel protocol or a MAC or IP address used in an Internet protocol.

As shown in FIG. 19, a range of a plurality of discontinuous logical volumes can be assigned to one host computer without any problem.

The switch control unit 72 refers to the host/logical volume correspondence table 600 and performs change-over operation over the switch 71.

As shown in FIG. 20, when the channel operation status 514 at the #2 channel of the channel number 512 was changed to '2' indicative of a high load, part of '0100 to 01FF' of the logical volumes assigned to the #2 channel is re-assigned to the '1F' channel number corresponding to '0' indicative of a low load of the channel operation status 514.

FIG. 21 show contents of the table 500 after the aforementioned reassignment.

In the present embodiment, 0180 to 01FF corresponding to half of the '0100 to 01FF' of the logical volumes so far assigned to the #2 channel was reassigned to the #'1F' channel. As a result, the channel #2 operation status 514 is changed to '1' indicative of a medium load, and the channel operation status 514 corresponding to #'1F' channel is also changed to '1' indicative of a medium load.

When such a table 500 as shown in FIG. 21 is copied to the memory module 105 of the front-end switch 7, the switch control unit 72 refers to the table 500 and modifies the host/logical volume correspondence table 600 as shown in FIG. 19.

FIG. 22 shows a table 600 after the above modification.

In the table 500, since '0180 to 01FF' of the logical volumes are assigned to the #'1F' channel, a #'1F' channel is newly assigned to a#2 host computer 652.

As a result, when the #2 host computer 652 issued an access request to the logical volumes '0180 to 01FF', the switch is changed to the #'1F' channel.

In this case, the microprocessor of the channel interface unit when receiving the access request accesses the local shared memory unit and knows that the request data is not present in its own disk control cluster. In this case, however, the microprocessor can know the disk control cluster having the request data by accessing the global information control unit, and thus can read out the request data from the disk control cluster in question.

As a result, the loads of the channels of the channel interface units in the storage system 1 can be balanced while the host computers do not have to pay consideration thereto and thus the entire performance of the system can be improved.

Further, even in a case where some channel having a channel number becomes unusable due to an error by reassigning the logical volumes by the aforementioned method, an access can be realized from another channel to the data stored in the disk controller of the target disk control cluster, while eliminating the need for the host computer to pay consideration to the channel error.

Further, when the load of the logical volume of the disk drives connected to a disk control cluster became high, the logical volume in question may, in some cases, be copied or moved to the disk drives of another disk control cluster for balancing the load. Even in this case, however, by reassigning the logical volume number and channel number in the table 500 by the aforementioned method, the load of the logical volume can be balanced while the host computer does not have to pay consideration to it.

Embodiment 8

Figure 24:
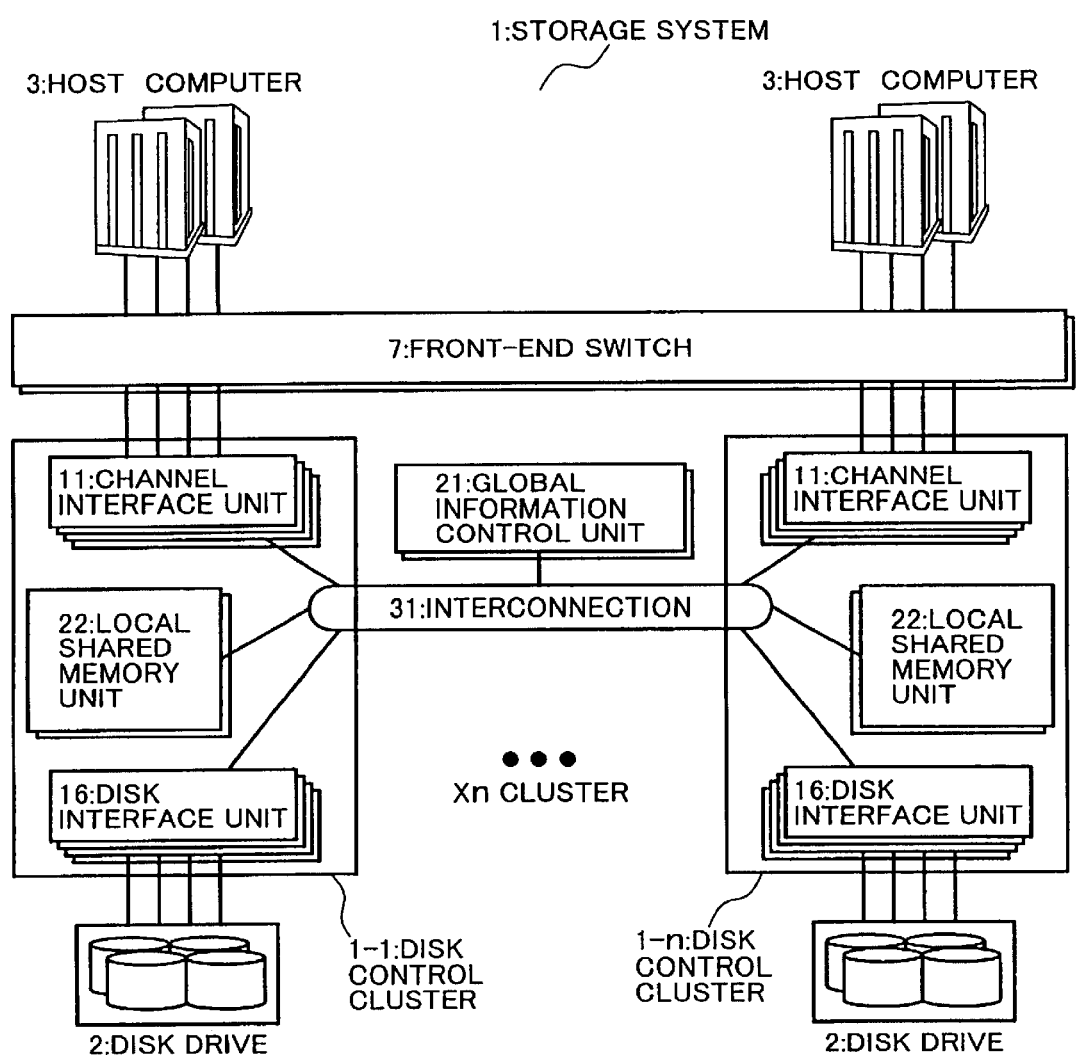
FIG. 24 shows an arrangement of a storage system in accordance with an embodiment 8 of the present invention.

FIG. 24 shows an embodiment of the present invention.

In the following embodiment, explanation will be made in connection with an example wherein a switch is used as an interconnection. However, any means such as bus may be employed, so long as it can be wired to be ale to transfer control information or data.

As shown in FIG. 24, a storage system 1 includes a plurality of disk control clusters 1-1 to 1-n and front-end switches 7.

The storage system 1 of the present embodiment is substantially the same as the storage system of the embodiment 1 shown in FIG. 1, except that the global information control units 21 and front-end switches 7 are not connected directly to each other.

A specific example of the storage system corresponds to the storage system 1 of FIG. 3 but the access control units 101 and memory controllers 73 are not provided.

As mentioned above, since the access control units 101 and memory controllers 73 are not provided, information about storage areas managed by the disk control clusters within the global information control units 21 as well as load and error information about sites within the disk control clusters are copied to the memory modules 105 of the front-end switches 7 via channel IF units 11 and switches 71.

The copying operation is carried out by the switch control unit 72 of the front-end switch 7 issuing a processing request to the microprocessor of the channel IF unit 11 via the channel IF unit 11 and switch 71.

For example, when the above connection paths can pass an Internet protocol therethrough, the above information can be acquired by a simple network management protocol (SNMP).

In accordance with the present embodiment, the need for connecting the front-end switch 7 and global information control unit 21 can be eliminated and the mounting of racks forming the storage system can be simplified.

In accordance with the present invention, there can be provided a storage system wherein a plurality of disk control clusters can be operated as a single system, and which ranges from a small scale configuration including a single disk control cluster to a huge scale configuration including tens of connected disk control clusters, which copes with an architecture having high reliability and performance possessed by the single disk control cluster, and which has a good scalability and handleability.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A storage system comprising,
    a plurality of disk control clusters, each of said plurality of disk control clusters having one or a plurality of channel interface units having interfaces with host computers, one or a plurality of disk interface units having interfaces with disk drives, and a local shared memory unit for storing data to be read/written from/to said disk drives, control information about transfer of said data and management information about said disk drives, said channel interface units executing data transfer between the interfaces with said host computers and said local shared memory units in response to a read/write request from said host computers, said disk interface units executing data transfer between said disk drives and said local shared memory units to read/write the data;
    a global information control unit for storing the data to be read/written from/to said disk drives and the management information about said disk control clusters;
    an interconnection connected between said plurality of disk control clusters; and
    a switch for connecting the channel interface units in said plurality of disk control clusters,
    wherein said switch has a memory to which the management information stored in said global information control unit is copied.

2. The storage system as set forth in claim 1, wherein connection units for connecting said channel interface units, said disk interface units and said local shared memory unit in one of said disk control clusters are connected to corresponding connection units of the other disk control clusters by means of said interconnection, and said global information control unit is connected to said interconnection and said switch.

3. The storage system as set forth in claim 1, wherein said channel interface units and said disk interface units are directly connected to said local shared memory unit in each of said disk control clusters, said local shared memory unit in the disk control cluster is connected to the local shared memory units in the other disk control clusters by means of said interconnection, and said global information control unit is connected to said interconnection and said switch.

4. The storage system as set forth in claim 1, wherein said channel interface units and said disk interface units are connected directly to said local shared memory unit in each of said disk control clusters, connection units for connecting said channel interface units and said disk interface units in one of said disk control clusters are connected to corresponding connection units of the other disk control clusters by means of said interconnection, and said global information control unit is connected to said interconnection and said switch.

5. A storage system comprising,
    a plurality of disk control clusters, each of said plurality of disk control clusters having one or a plurality of channel interface units having interfaces with host computers, one or a plurality of disk interface units having interfaces with disk drives, and a global information control unit for storing data to be read/written from/to said disk drives, control information about transfer of said data and management information about said disk drives, said channel interface units executing data transfer between the interfaces with said host computers and said global information control unit in response to a read/write request from said host computers, said disk interface units executing data transfer between said disk drives and said global information control unit to read/write the data;
    an interconnection connected between said plurality of disk control clusters; and
    a switch for connecting the channel interface units in said plurality of disk control clusters,
    wherein said switch has a memory to which the management information stored in said global information control unit is copied.

6. The storage system as set forth in claim 5, wherein connection units for connecting said channel interface units and said disk interface units in one of said disk control clusters are connected to corresponding connection units of the other disk control clusters by means of said interconnection, and said global information control unit is connected to said switch by means of said interconnection.

7. A storage system comprising,
a plurality of disk control clusters, each of said plurality of disk control clusters having one or a plurality of channel interface units having interfaces with host computers, one or a plurality of disk interface units having interfaces with disk drives, and a local shared memory unit having first and second memories, said first memory storing data to be read/written from/to said disk drives, said second memory storing control information about data transfer between said channel interface units and said disk interface units and said first memory and also storing management information about said disk drives, said channel interface units executing the data transfer between the interfaces with said host computers and said first memory of said local shared memory units in response to a read/write request from said host computers, said disk interface units executing the data transfer between said disk drives and said first memory of said local shared memory units to read/write the data;
a global information control unit for storing management information about said disk control clusters;
two first and second different interconnections for interconnecting said plurality of disk control clusters; and
a switch for connecting the channel interface units in said plurality of disk control clusters,
wherein said switch has a memory to which the management information stored in said global information control unit is copied.

8. The storage system as set forth in claim 7, wherein said channel interface units and said disk interface units in each of said disk control clusters are connected directly to said second memory in said local shared memory unit in said disk control cluster, first connection units for connecting said channel interface units and said disk interface units in one of said disk control clusters are connected to corresponding first connection units of the other disk control clusters via said first interconnection, second connection units for connecting said channel interface units, said disk interface units and said first memory of said local shared memory unit in one of said disk control cluster are connected to corresponding second connection units of the other disk control clusters via said second interconnection and said global information control unit is connected to said first interconnection and said switch.

9. A plurality of disk control clusters, each of said plurality of disk control clusters comprising,
one or a plurality of channel interface units having interfaces with host computers;
one or a plurality of disk interface units having interfaces with disk drives
a local shared memory unit for storing data to be read/written from/to said disk drives, control information about transfer of said data and management information about said disk drives; and
first connection units for connecting said channel interface units, said disk interface units and said local shared memory unit, said channel interface units executing the data transfer between the interfaces with said host computers and said local shared memory units in response to a read/write request from said host computers, said disk interface units executing the data transfer between said disk drives and said local shared memory units to read/write the data,
wherein said channel interface units in said plurality of disk control clusters are connected to each other by a switch, a global information control unit for storing the data to be read/written from/to said disk drives and management information about said disk control clusters is connected to said switch, and said first connection units of said disk control cluster have a connection path leading to second connection units connected with said global information control unit.

10. A storage system comprising,
a plurality of disk control clusters, each of said plurality of disk control clusters having one or a plurality of channel interface units having interfaces with host computers, one or a plurality of disk interface units having interfaces with disk drives, a local shared memory unit for storing data to be read/written from/to said disk drives, control information about transfer of said data and management information about said disk drives, and first connection units for connecting said channel interface units, said disk interface units and said local shared memory unit, said channel interface units executing data transfer between the interfaces with said host computers and said local shared memory units in response to a read/write request from said host computers, said disk interface units executing data transfer between said disk drives and said local shared memory units to read/write the data;
a global information control unit for storing management information about said disk control clusters; and
a switch for connecting the channel interface units in said plurality of disk control clusters,
wherein said global information control unit is connected to second connection units and said switch by connection paths, the first connection units of said disk control clusters are connected to the second connection units of said disk control clusters by connection paths, and said switch has a memory to which the management information stored in said global information control unit is copied.

11. A method for increasing the number of disk control clusters in a storage system, said storage system comprising,
a plurality of disk control clusters, each of said plurality of disk control clusters having one or a plurality of channel interface units having interfaces with host computers, one or a plurality of disk interface units having interfaces with disk drives, a local shared memory unit for storing data to be read/written from/to said disk drives, control information about transfer of said data and management information about said disk drives, and first connection units for connecting said channel interface units, said disk interface units and said local shared memory unit, said channel interface units executing data transfer between the interfaces with said host computers and said local shared memory units in response to a read/write request from said host computers, said disk interface units executing data transfer between said disk drives and said local shared memory units to read/write the data;
a global information control unit for storing management information about said disk control clusters; and
a switch for connecting the channel interface units in said plurality of disk control clusters, wherein said global information control unit is connected to second connection units and said switch by a connection path, the first connection units of said disk control clusters are connected to the second connection units of said disk control clusters by connection paths, said switch has a memory to which the management information stored in said global information control unit is copied, said method comprising the steps of:

providing one or more first connectors connected with said first connection units to a first rack having said disk control clusters mounted therein;

providing a plurality of second connectors connected with the second connection units and one or more third connectors connected with said global information control unit to a second rack having said global information control unit and said second connection units connected with said global information control unit mounted therein;

providing fourth connectors connected with said switch to a third rack having said switch mounted therein;

connecting the first connectors of said first rack and the second connectors of said second rack by connection paths;

connecting the third connectors of said second rack and the fourth connectors of said third rack by connection paths; and when a new disk control cluster is added in the storage system, connecting the first connectors of said added disk control cluster to said second connectors by connection paths.

12. The method as set forth in claim 11, wherein said global information control unit has a first table indicative of whether or not said disk control clusters are connected to said second connectors of said second connection units and a second table indicative of storage areas to be managed by said disk control clusters connected to said second connectors, and when said disk control cluster is newly added, effective information about said added disk control cluster is added in said first and second tables.

13. The storage system as set forth in claim 1, wherein the local shared memory unit of said each disk control cluster stores load and error information about parts in said disk control cluster and storage area information to be managed by the disk control cluster, said global information control unit has a memory, said memory stores said load and error information about said disk control cluster and address information about the storage area, said load and error information and said storage area address information in said local shared memory unit are referred to at intervals of a time to update the load and error information and the storage area address information in said memory.

14. The storage system as set forth in claim 13, wherein said global information control unit copies said load and error information and said storage area address information in said memory at intervals of a time to the memory in said switch.

15. The storage system as set forth in claim 1, wherein said global information control unit has a memory, said memory stores error information and load information about parts in said disk control cluster, said disk control cluster updates said error or load information in the memory of said global information control unit when an error took place in some part of the disk control cluster or a load of some part became higher than a preset value.

16. The storage system as set forth in claim 1, wherein said global information control unit has a memory, said memory stores address information for storage area to be managed by said each disk control cluster, said disk control cluster updates said storage area address information in the memory of said global information control unit when data on a storage area in the disk control cluster was copied or moved to another storage area within another disk control cluster.

17. The storage system as set forth in claim 16, wherein said global information control unit copies said load, error or storage area address information in said memory to the memory in said switch when said load, error or storage area address information in the memory was updated.

18. The storage system as set forth in claim 15, wherein said global information control unit copies said load, error or storage area address information in said memory to the memory in said switch when said load, error or storage area address information in the memory was updated.

19. The storage system as set forth in claim 15, wherein said switch has a connection change-over table between a plurality of ports of said switch, and said switch table is updated when said load, error or storage area address information was updated.

20. The storage system as set forth in claim 1, wherein connection units for connecting said channel interface units, said disk interface units and said local shared memory unit in said each disk control cluster are connected to corresponding connection units in the other disk control clusters by said interconnection, and said global information control unit is connected to said interconnection.

21. A storage system comprising:

a plurality of host computers;

a plurality of disk drives;

a plurality of disk control clusters, each of which has one or a plurality of channel interface units having interfaces with said host computers, one or a plurality of disk interface units having interfaces with said disk drives, and a memory unit for storing data to be read/written from/to said disk drives, control information regarding transfer of said data and management information regarding said disk drives, said channel interface units executing data transfer between said host computers and said memory unit, said disk interface units executing data transfer between said disk drives and said memory unit to read/write the data;

a switch;

a global information control unit for storing the management information regarding said disk control clusters; and an interconnection connected between said plurality of disk control clusters and said global information control unit.

22. The storage system according to claim 21, wherein each of said plurality of disk control clusters includes a connection unit for connecting paths from said channel interface units, said disk interface units, and said memory unit.

23. The storage system according to claim 21, wherein said channel interface units and said disk interface units are connected to said memory unit in each of said disk control clusters, and said memory unit in one of the disk control clusters is connected to the memory units in other disk control clusters by means of said interconnection.

24. The storage system according to claim 21, wherein said switch has a memory, and the management information regarding said disk control clusters noted in said global information control unit is copied into the memory of said switch through paths which connect said channel interface units and said switch.

25. The storage system according to claim 24, wherein said memory of said switch stores management information for managing storage areas therein, load and error information regarding parts in said disk control cluster used by said plurality of disk control clusters.

26. The storage system according to claim 24, wherein said management information regarding said disk control clusters stored in said global information control unit is copied through said paths, when a switch control unit in said switch issues a processing request to a microprocessor of one of the channel interface units via a path between said channel interface unit and said switch.

* * * * *